US009756368B2

(12) United States Patent
Nelson

(10) Patent No.: US 9,756,368 B2
(45) Date of Patent: *Sep. 5, 2017

(54) METHODS AND APPARATUS TO IDENTIFY MEDIA USING HASH KEYS

(71) Applicant: The Nielsen Company (US), LLC, New York, NY (US)

(72) Inventor: Daniel Nelson, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,087

(22) Filed: Jul. 19, 2016

(65) Prior Publication Data

US 2016/0330496 A1    Nov. 10, 2016

Related U.S. Application Data

(63) Continuation of application No. 14/473,670, filed on Aug. 29, 2014, now Pat. No. 9,438,940.

(Continued)

(51) Int. Cl.
*H04L 9/00* (2006.01)
*H04N 21/24* (2011.01)
(Continued)

(52) U.S. Cl.
CPC ..... *H04N 21/2407* (2013.01); *H04N 21/2353* (2013.01); *H04N 21/23418* (2013.01); *H04N 21/835* (2013.01)

(58) Field of Classification Search
CPC . H04L 63/0428; H04L 63/062; H04L 9/0869; H04L 9/12
See application file for complete search history.

(56) References Cited

U.S. PATENT DOCUMENTS

| 5,371,499 A | 12/1994 | Graybill et al. |
| 5,686,902 A | 11/1997 | Reis et al. |

(Continued)

FOREIGN PATENT DOCUMENTS

| EP | 2629212 | 8/2013 |
| WO | 2011087756 | 7/2011 |

(Continued)

OTHER PUBLICATIONS

International Bureau, "International Preliminary Report on Patentability," issued in connection with International Patent Application No. PCT/US2014/067939, mailed Oct. 20, 2016, 6 pages.

(Continued)

*Primary Examiner* — Ghazal Shehni
(74) *Attorney, Agent, or Firm* — Hanley, Flight & Zimmerman, LLC

(57) ABSTRACT

Methods and apparatus are disclosed to correct hash keys. An example method involves accessing a first metered hash key and first reference metadata associated with the first metered hash key. Accessing second reference metadata associated with a second hash key adjacent to the first metered hash key. Determining if the first metered hash key is unexpected. When the first metered hash key is unexpected, generating an error level using a first bitwise comparison of the first metered hash key and the second hash key. Determining if the error level satisfies a threshold. When the error level satisfies the threshold, storing the second hash key as the first metered hash key.

20 Claims, 17 Drawing Sheets

Related U.S. Application Data

(60) Provisional application No. 61/976,238, filed on Apr. 7, 2014.

(51) Int. Cl.
  *H04N 21/835* (2011.01)
  *H04N 21/234* (2011.01)
  *H04N 21/235* (2011.01)

(56) References Cited

U.S. PATENT DOCUMENTS

| | | |
|---|---|---|
| 6,453,252 B1 | 9/2002 | Laroche |
| 6,593,976 B1 | 7/2003 | Lord |
| 6,785,714 B1 | 8/2004 | Thompson et al. |
| 6,990,453 B2 | 1/2006 | Wang et al. |
| 7,328,153 B2 | 2/2008 | Wells et al. |
| 7,668,851 B2 | 2/2010 | Triplett |
| 7,831,531 B1 | 11/2010 | Baluja et al. |
| 7,921,296 B2 | 4/2011 | Haitsma et al. |
| 8,184,953 B1 | 5/2012 | Covell et al. |
| 8,266,115 B1 | 9/2012 | Park et al. |
| 8,510,608 B2 | 8/2013 | Futa et al. |
| 9,438,940 B2 | 9/2016 | Nelson |
| 2004/0059933 A1 | 3/2004 | Levy |
| 2005/0177738 A1 | 8/2005 | Van Der Veen et al. |
| 2007/0124756 A1 | 5/2007 | Covell et al. |
| 2007/0143778 A1 | 6/2007 | Covell et al. |
| 2008/0263360 A1 | 10/2008 | Haitsma et al. |
| 2008/0263579 A1 | 10/2008 | Mears et al. |
| 2009/0154916 A1 | 6/2009 | Huang et al. |
| 2009/0193052 A1 | 7/2009 | FitzGerald et al. |
| 2010/0274755 A1 | 10/2010 | Stewart |
| 2011/0264663 A1 | 10/2011 | Verkasalo |
| 2013/0142331 A1 | 6/2013 | Schultz |
| 2013/0283053 A1* | 10/2013 | Hwang ............ H04N 21/44213 713/168 |
| 2014/0189279 A1 | 7/2014 | Seo et al. |
| 2015/0288513 A1 | 10/2015 | Nelson |

FOREIGN PATENT DOCUMENTS

| | | |
|---|---|---|
| WO | 2012089288 | 7/2012 |
| WO | 2013158066 | 10/2013 |

OTHER PUBLICATIONS

International Searching Authority, "International Search Report," issued in connection with International Patent Application No. PCT/US2014/067939, mailed Feb. 16, 2015 (3 pages).

International Searching Authority, "Written Opinion," issued in connection with International Patent Application No. PCT/US2014/067939, mailed Feb. 16, 2015 (4 pages).

Hagmuller et al., "Audio Fingerprint," Institute for Signal Processing and Speech Communication, Digitale Audiotechnik 2, VO, Jun. 4, 2009 (11 pages).

Moravec et al., "A Comparison of Extended Fingerprint Hashing and Locality Sensitive Hashing for Binary Audio Fingerprints," ICMR, Apr. 17-20, 2011 (8 pages).

Ke et al, "Computer Vision for Music Identification," Intel Corporation, 2004 (5 pages).

Fink et al., "Social- and Interactive-Television Applications Based on Real-Time Ambient-Audio Identification," retrieved from <http://mangolassi.org/covell/pubs/euroITV-2006.pdf>, retrieved on Apr. 4, 2014 (10 pages).

Haitsma et al., "Robust Audio Hashing for Content Identification," 2001, retrieved from <http://citeseerx.ist.psu.edu/viewdoc/download?doi=10.1.1.16.2893&rep=rep1&type=pdf>, retrieved on Apr. 4, 2014 (8 pages).

United States Patent and Trademark Office, "Non-Final Office Action," issued in connection with U.S. Appl. No. 14/473,670, mailed Oct. 15, 2015 (5 pages).

United States Patent and Trademark Office, "Notice of Allowance," issued in connection with U.S. Appl. No. 14/473,670, mailed May 20, 2016 (8 pages).

IP Australia, "Examiner's Report No. 1 for Standard Patent Application," issued in connection with Australian Paten Application No. 2014389996, mailed Apr. 8, 2017, 2 pages.

\* cited by examiner

| METER ID | PANELIST ID | [REFERENCE METADATA] | TIMESTAMP |
|---|---|---|---|
| 2745 | 51 | ["CALL ME MAYBE", 277MU, 12349] | 3-26-2014 T9:26:41Z |
| 2745 | 51 | ["CALL ME MAYBE", 277MU, 12350] | 3-26-2014 T9:26:41Z |
| 2745 | 51 | ["CALL ME MAYBE", 277MU, 12351] | 3-26-2014 T9:26:42Z |
| 2745 | 51 | ["CALL ME MAYBE", 277MU, 12352] | 3-26-2014 T9:26:42Z |
| 2745 | 51 | [TOASTER WAFFLE CM, 1993CM, 1] | 3-26-2014 T9:26:42Z |
| 2745 | 51 | [TOASTER WAFFLE CM, 1993CM, 2] | 3-26-2014 T9:26:42Z |

FIG. 3

METHODS AND APPARATUS TO IDENTIFY MEDIA USING HASH KEYS

RELATED APPLICATIONS

This patent arises from a continuation of U.S. patent application Ser. No. 14/473,670, filed Aug. 29, 2014, now U.S. Pat. No. 9,438,940, which claims the benefit of U.S. Provisional Patent Application Ser. No. 61/976,238, filed Apr. 7, 2014, both of which are incorporated by reference in their entireties herein.

FIELD OF THE DISCLOSURE

This disclosure relates generally to audience measurement and, more particularly, to methods and apparatus to identify media using hash keys.

BACKGROUND

Audience measurement of media, such as television, music, movies, radio, internet websites, streaming media, video games, etc., is typically carried out by monitoring media exposure of panelists that are selected to represent a particular demographic group. The captured media exposure data is processed using various statistical methods to determine audience size and demographic composition(s) for programs of interest. The audience size and demographic information is valuable to advertisers, broadcasters and/or other entities. For example, audience size and demographic information may be used as factors in selecting the placement of advertisements, and may be used as factors in valuing commercial time slots during a particular program.

BRIEF DESCRIPTION OF THE DRAWINGS

FIG. 3 illustrates an example data structure that may be used to store impression records generated by the example hash key manager of FIG. 1.

DETAILED DESCRIPTION

Figure 1:
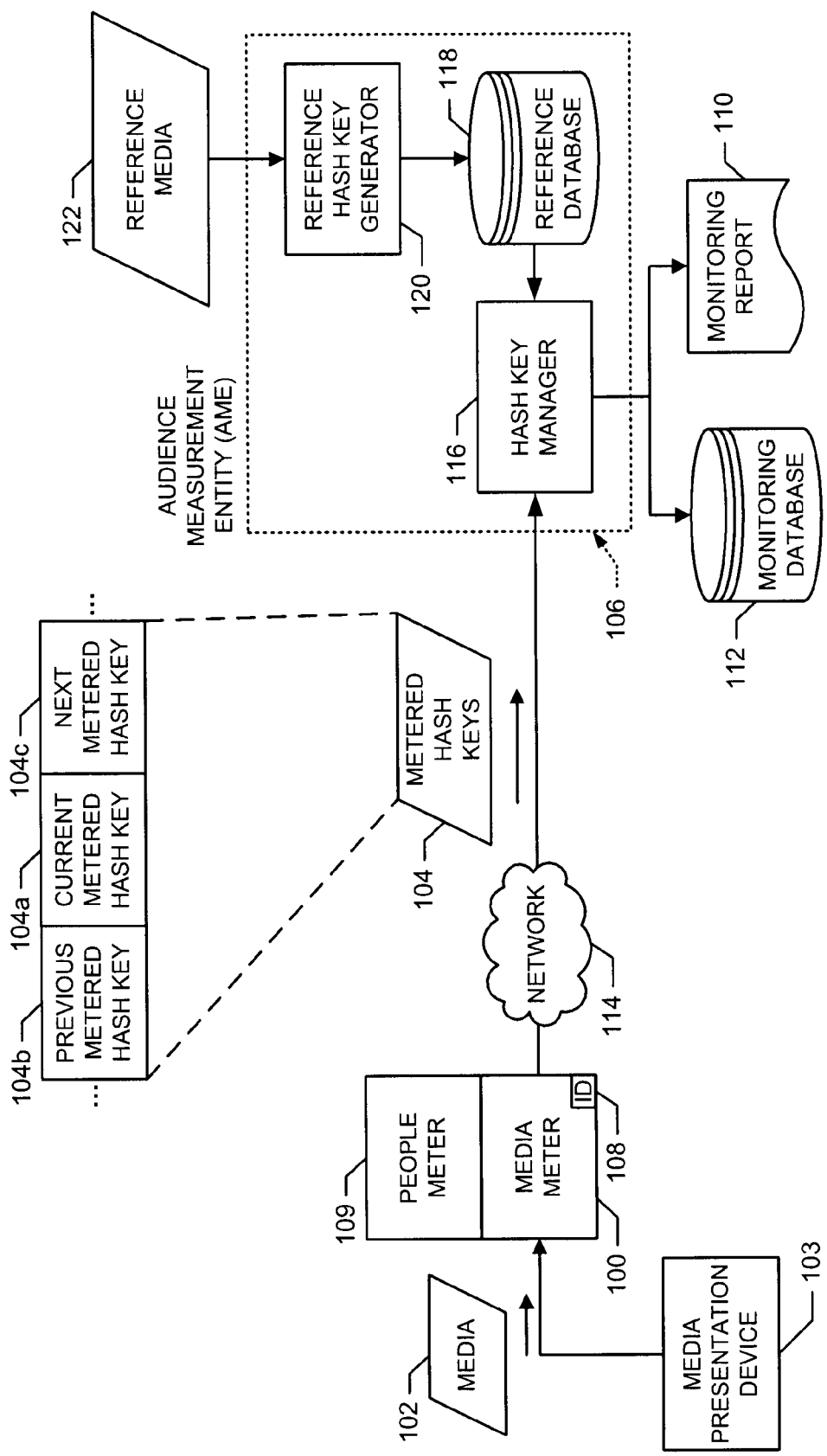
FIG. 1 illustrates an example system constructed in accordance with the teachings of this disclosure and having a media meter in communication with an audience measurement entity to monitor media presentations.

Examples disclosed herein may be used to identify media (e.g., movies, music, television programs, radio programming, television advertisements, radio advertisements, video games, etc.) using hash keys associated with the media. Further example techniques to identify media using hash keys, which can be employed in conjunction with the examples provided herein, are disclosed in U.S. patent application Ser. No. 14/469,245 entitled "SIGNATURE RETRIEVAL AND MATCHING FOR MEDIA MONITORING" and filed on Aug. 26, 2014, which is hereby incorporated by reference in its entirety.

To create indexable identifiers for portions of media of interest, in examples disclosed herein, the media is sampled at a particular frequency (e.g., 15 Hz, 30 Hz, 64 Hz, etc.). Using one or more fingerprinting techniques, such as robust audio hashing, hash keys are generated based on the samples of the media. In some robust audio hashing examples, binary values represent differences in energy between frequency bands of a sample. In some such examples, a hash key has a length in bits corresponding to the number of energy bands used to create the hash key (e.g., a 64-bit length hash key corresponds to the differences between 65 energy bands). Samples of the media may be hashed, for example, in accordance with the techniques described by Haitsma et al. in an article entitled, "Robust Audio Hashing for Content Identification." Through the hash key generation process, consecutive samples of the media do not produce consecutive hash keys. For example, a hash key generated by a first sample of the media may be 0x712F, and a hash key generated by the next sample of the media following the first sample (and corresponding to an adjacent segment of the media) may be 0x003A. In prior techniques, a hash key from a previous sample (e.g., preceding a current sample in time) and the hash key from a next sample (e.g., following the current sample in time) cannot be discerned based on a hash key corresponding to a current sample.

To generate reference hash keys, a reference version of media is sampled at a sampling frequency (e.g., 15 Hz, 30 Hz, 64 Hz, etc.). In some examples, reference media is media (e.g., a song, a television program, a radio program, a video and/or audio spot or clip, an advertisement, streaming media, etc.) that has the same or higher quality than media typically obtained by and/or presented to a user. In some examples, the reference media is free from noise (e.g., white noise, pink noise, brown noise, etc.) and/or is stored and/or decoded using a lossless format (e.g., Free Lossless Audio Codec (FLAC), Waveform Audio File Format (WAV), Apple® Lossless Audio Codec (ALAC), etc.). For example, a reference version (or reference media) of audio (e.g., collected in a controlled environment, such as a studio) may be a high quality, lossless digital copy of the song relative to whereas a streamed version (e.g., measured media) of the same audio will typically exhibit lower quality and less accuracy in its reproduction and playback due to environmental noise, transmission losses, etc.

In examples disclosed herein, a reference record is constructed by generating a reference hash key for a sample of reference media. Metadata (e.g., the name of the corresponding media, a time and/or offset in the media corresponding to the sample, etc.) related to the sample is stored in the reference record in association with the reference hash key. In some examples, a hash key corresponding to an adjacently preceding (e.g., in time) reference sample and a hash key corresponding to an adjacently following (e.g., in time) sample are also stored in the same reference record in association with the reference hash key and the metadata. Thus, in some examples disclosed herein, a reference record has three reference hash keys stored therein, namely a current hash key (which is the subject or focus of the reference record), an adjacently preceding hash key (which corresponds to a sample occurring before (in time) a sample of the present hash key), and an adjacently following hash key (which corresponds to a sample occurring after (in time) a sample of the present hash key).

Although termed "adjacently preceding reference hash keys" and/or "adjacently following reference hash keys," in some examples disclosed herein, samples corresponding to the adjacently preceding and adjacently following reference hash keys need not be in temporal abutment with the sample corresponding to the present reference hash key. For example, there may be non-sampled portions of media between samples corresponding to the adjacently preceding reference hash key and the present hash key and/or between the present reference hash key and the adjacently following reference hash key. In some examples, a preceding reference hash key and a following reference hash key stored in a reference record in association with a present reference hash key do not correspond to samples that are immediately adjacent to the sample of the present reference hash key. That is, samples corresponding to the preceding reference hash key and the current reference hash key may have one or more intervening samples therebetween. Additionally or alternatively, there may be one or more intervening samples between samples corresponding to the present reference hash key and the following reference hash key. In other examples, there are no intervening samples, and the hash keys correspond to samples which abut in time.

In some examples, an audience measurement entity (AME) contacts and/or enlists panelists using any desired methodology (e.g., random selection, statistical selection, phone solicitations, Internet advertisements, surveys, advertisements in shopping malls, product packaging, etc.). Demographic information (e.g., gender, occupation, salary, race and/or ethnicity, marital status, highest completed education, current employment status, etc.) is obtained from a panelist when the panelist joins (i.e., registers for) a panel. Additionally or alternatively, demographic information may be obtained through other methods during an enrollment process (e.g., via a telephone interview, by having the panelist complete an online survey, etc.). In some examples, the AME provides a media meter (e.g., a set top meter, a personal portable meter (PPM), an on-device meter, a portable media player meter, etc.) to the panelist after the panelist enrolls into the panel.

In some examples, the media meters collect metered samples by sampling media from media sources that are within sufficient detection proximity to the meter. For example, a set top meter may sample audio from a movie presented via a media presentation device, such as a television located in the same room as the set top meter, or a portable media player meter may sample audio presented via a media presentation device such as a portable media player (e.g., an MP3 player, an Apple® iPod®, etc.). In some examples, the sample is captured using a microphone of the media meter. In some examples, the media meter obtains the metered sample through a wired connection (e.g., to an audio out jack) via a splitter or an in-line configuration via which the media meter intercepts portions of the media as they are communicated between a media source and headphones, etc. In some examples, the media samples are sampled by the media meters at the same frequency as the reference samples were sampled. In some examples, the metered samples are sent to a central office of the AME where metered hash keys are generated based on the metered samples. In some examples, the media meter is provided with a hash key generator to locally generate metered hash keys. In some such examples, the media meter sends metered hash keys to the central office.

In some examples, errors arise in the media presentation before the media presentation is sampled by a media meter. For example, converting media from a lossless format (e.g., Free Lossless Audio Codec (FLAC), Waveform Audio File Format (WAV), Apple® Lossless Audio Codec (ALAC), etc.) to a lossy format (e.g., MPEG Audio Layer III (MP3), Advanced Audio Coding (AAC), Ogg Vorbis, etc.) may change the media sufficiently so that a metered hash key generated based on a portion (e.g., a segment) of the lossy-format media is different from a reference hash key corresponding to a non-lossy format of the same portion (e.g., the same segment) of the media. Additionally or alternatively, ambient noise and/or attenuation may also introduce errors into samples of the measured media. Transmission errors may also be a source of errors in metered hash keys. These sources of noise, loss and/or error may cause one or more bits of the metered hash key to be different relative to a corresponding reference hash key.

In examples disclosed herein, the AME receives the metered hash keys from the media meter and compares the metered hash keys to reference hash keys in the reference hash table. When a metered hash key matches a reference hash key, an impression for corresponding media (e.g., reference media corresponding to the matching reference hash key) is logged. In some examples, metadata corresponding to the reference hash key is retrieved from a corresponding reference record, and the metadata is stored in association with the logged impression. In some examples, information (e.g., demographics, panelist identifier (ID), etc.) associated with one or more panelists and/or a timestamp indicative of a time at which the metered media was presented and additionally or alternatively stored in association with the logged impression. In some examples, when a metered hash key does not match a reference hash key, an error handler determines whether the metered hash key sufficiently matches (e.g., within a threshold permissible difference, such as 90% of the bits of the meter hash key match) a preceding reference hash key or a following reference hash key. If the metered hash key sufficiently matches the preceding reference hash key or the following reference hash key, the error manager of some such examples corrects the error(s). In some examples, an impression to the corresponding portion of the media presentation is logged based on such error correction. Otherwise, the metered hash key is discarded.

In some examples, the AME validates a block of the metered hash keys to correct valid, but unexpected, hash keys. An unexpected hash key may occur when an error changes a metered hash key to be another valid hash key (e.g., the erroneous metered hash key is in the reference database, but is associated with a different media presentation that is not meant to correspond to the metered hash key, etc.). Therefore, as used herein, an unexpected hash key is a hash key that exists in the reference database, but whose reference metadata that does not match the sequence of the reference metadata of an adjacent metered hash key (e.g., a preceding hash key and/or a following hash key). For example, if the reference metadata for the preceding metered hash key is the 245th sample of a song titled "Clarity," the expected hash key would have reference metadata corresponding to the 246th sample of the song titled "Clarity." In that example, if the reference metadata of the current hash key corresponds to the 9681th sample of a song titled "Spectrum," the current hash key would be designated as unexpected. To determine whether the current hash key is unexpected, the current hash key is compared to the reference hash keys in the database. If a matching reference hash key is found, the reference metadata stored in association with the matching reference hash key is compared to reference metadata corresponding to an adjacent metered hash key. If the reference metadata corresponding to the current hash key is not expected (e.g., the corresponding media title does not match and/or the sample position is not adjacent), then a potential hash key is retrieved from the adjacent metered hash key. An error level is calculated between the current metered hash key and the potential hash key. If the error level satisfies a threshold (e.g., the error level is less than or equal to the threshold), the potential hash key is substituted for the current metered hash key. In some such examples, this example of unexpected hash keys occurs during a post-processing step (e.g., after the metered hash keys have been initially processed).

FIG. 1 illustrates an example media meter 100 (e.g., a set top meter, a personal people meter, an on-device meter, a portable media player meter, etc.) constructed in accordance with teachings of this disclosure to sample example media 102 output by an example media presentation device 103. The example media meter 100 of FIG. 1 generates example metered hash keys 104. In the illustrated example of FIG. 1, the metered hash keys 104 comprise a series of metered hash keys (e.g., metered hash keys 104a-104c). As used herein, a "current metered hash key" refers to a metered hash key in a series of hash keys that is currently being processed. As used herein, a "previous metered hash key" refers to a metered hash key preceding or adjacently preceding the current metered hash key. As used herein, a "next metered hash key" refers to a metered hash key following or adjacently following the current metered hash key. FIG. 1 illustrates an example current metered hash key 104a, an example previous metered hash key 104b, and an example next metered hash key 104c. The current metered hash key 104a, the previous metered hash key 104b, and the next metered hash key 104c are collectively referred to herein as a sequence of metered hash keys 104.

In the illustrated example, the media meter 100 sends the metered hash keys 104 to an audience measurement entity (AME) 106. In some examples, the media meter 100 sends a meter ID 108 (e.g., an alphanumeric value (preferably uniquely) which identifies the media meter 100) with the metered hash keys 104. In some examples, a people meter 109 is associated with the media meter 100 to identify persons in the audience at the time the metered hash keys 104 are collected. In some examples, people identification data collected by the people meter 109 is returned with the metered hash keys 104 and/or with the meter ID 108. The example media meter 100 communicates with the example AME 106 through an example network 114 (e.g., the Internet, a local area network, a wide area network, etc.) via wired and/or wireless connections (e.g., a cable/DSL/satellite modem, a cell tower, etc.).

In the illustrated example of FIG. 1, the AME 106 processes the metered hash keys 104 and, in some examples, the people identification information to generate a monitoring report 110. In some examples, the monitoring report 110 includes identity information (e.g., panelist identifiers, demographic information, etc.) corresponding to the one or more people associated with the meter ID 108. In some such examples, a people meter 109 generating people identification information is not employed. In other examples, the identity information is based on the people identification information collected by the people meter 109. In some examples, the AME 106 maintains a monitoring database 112 including the monitoring reports 110 corresponding to one or more meters (e.g., the media meter 100).

The AME 106 of the illustrated example of FIG. 1 includes a hash key manager 116 to process the metered hash keys 104 to correct erroneous metered hash keys and/or to generate the monitoring reports 110. The example AME 106 also includes a reference database 118, and a reference hash key generator 120. In the illustrated example, the reference hash key generator 120 samples reference media 122 (e.g., media that has the same or higher quality than media obtained by and/or presented to a user) to generate and maintain the reference database 118. In some examples, the reference database 118 is implemented as a hash table storing the reference hash keys generated by the reference hash key generator 120 as indices of reference records in the hash table. The example AME 106 of FIG. 1 maintains the example reference database 118 by adding, removing, and/or updating reference hash keys. The hash key manager 116 of the illustrated example of FIG. 1 queries the reference database 118 with a metered hash key (e.g., the current metered hash key 104a) to compare the metered hash key to one or more reference hash keys. In addition, the example hash key manager 116 handles and corrects errors in the example metered hash keys 104.

Figure 2:
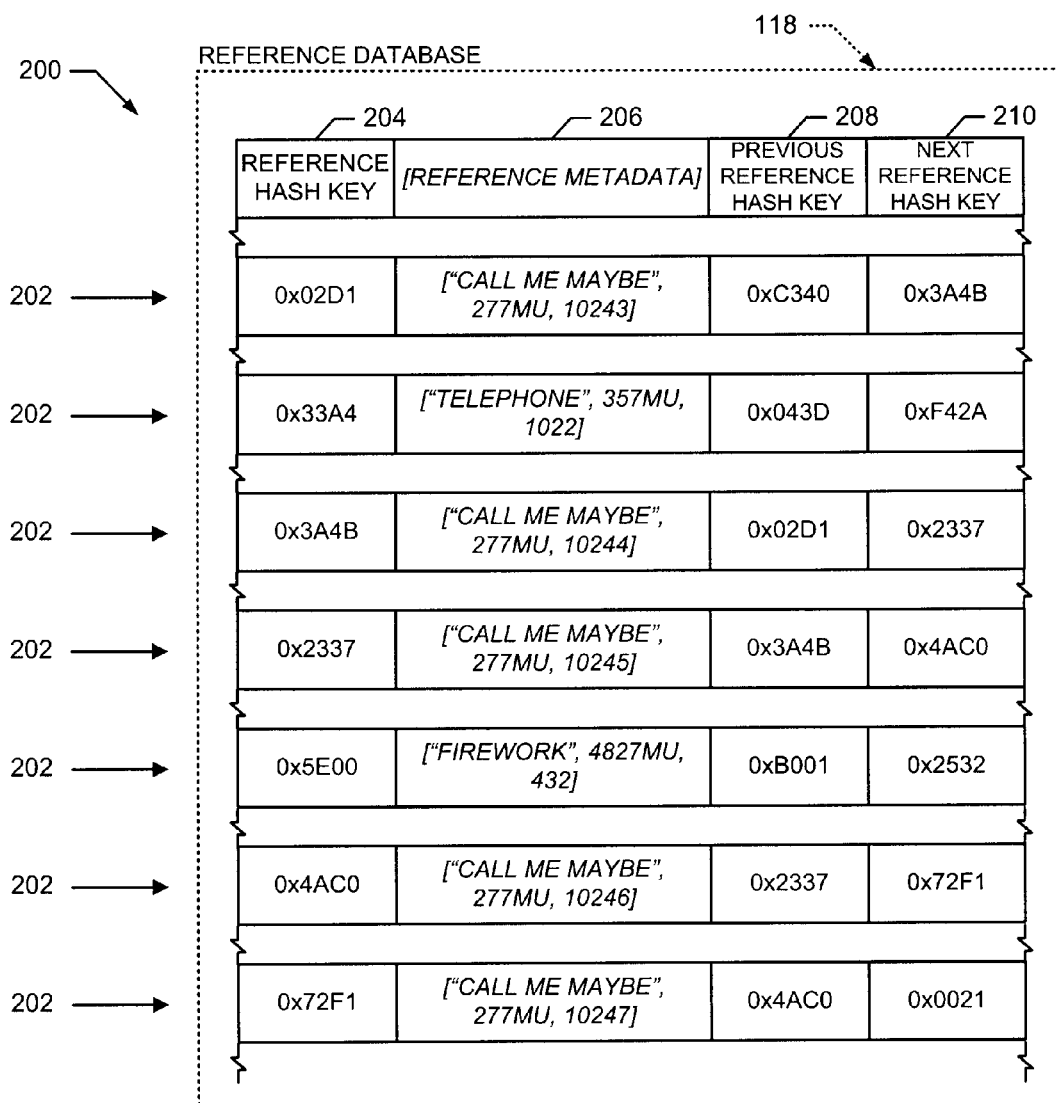
FIG. 2 illustrates an example implementation of the reference database of FIG. 1 that may be used to store reference metadata in association with reference hash keys of corresponding media.

FIG. 2 depicts an example data structure 200 that may be generated and/or maintained by the example AME 106 (FIG. 1) and stored in the example reference database 118 (FIG. 1). In the illustrated example of FIG. 2, the data structure 200 includes a plurality of rows, each corresponding to a respective reference record 202. The example reference records 202 associate reference hash keys 204 with corresponding reference metadata 206. The example reference records 202 of the example of FIG. 2 are generated by the reference hash key generator 120 of FIG. 1 using the example reference media 122 (FIG. 1). The reference database 118 (FIG. 1) stores reference hash keys for many media titles. The reference hash keys are stored in the reference database 118 as sequentially numbered values or keys. However, because in the illustrated example consecutive samples of a particular reference media do not typically result in consecutively numbered reference hash keys, reference hash keys corresponding to consecutive samples are stored in the reference database 118 at locations separated by one or more non-related hash keys (e.g., hash keys corresponding to other media). The example reference metadata 206 of FIG. 2 contains information (e.g., title, a media identifier, a timestamp, a sample number, etc.) relevant to the identity of the reference media 122.

In the example illustrated in FIG. 2, a reference record 202 also associates a previous reference hash key 208 and a next reference hash key 210 with a corresponding reference hash key 204. In the illustrated example of FIG. 2, the previous reference hash key 206 refers to a preceding or an adjacently preceding reference hash key that corresponds to a sample of the same media 124 that is preceding or adjacently preceding a sample corresponding to the reference hash key 204. In the illustrated example of FIG. 2, the next reference hash key 206 refers to a following or an adjacently following reference hash key that corresponds to a sample of the same media 124 that follows or adjacently follows a sample corresponding to the reference hash key 204. For example, if the reference hash key 204 corresponds to the 2496th sample (e.g., a sample corresponding to playback time 0:39.0000 seconds and collected at a sampling frequency of 64 Hz) of the reference media 122, the previous reference hash key 208 may correspond to the 2495th sample (e.g., a sample corresponding to playback time 0:38.9844 seconds and collected at a sampling frequency of 64 Hz), and the next reference hash key 210 may correspond to the 2497th sample (e.g., a sample beginning at playback time 0:39.0156 seconds collected at a sampling frequency of 64 Hz).

FIG. 3 depicts an example data structure 300 that may be generated by the hash key manager 116 (FIG. 1) to be included on the example monitoring report 110 (FIG. 1) and/or stored in the example monitoring database 112 (FIG. 1). The example data structure 300 of FIG. 3 includes a plurality of rows, each corresponding to a different example impression record 302. The example impression records 302 of the illustrated example are generated by the example hash key manager 116 when a metered hash key 104 (FIG. 1) matches a reference hash key 204 (FIG. 2) in the reference database 118 (FIG. 1). In the example illustrated in FIG. 3, the impression records 302 include the meter ID 108 associated with the media meter 100 (FIG. 1), a panelist ID 304, reference metadata 206 (FIG. 2), and a timestamp 306. The example reference metadata 206 is obtained from an example reference record 202 (e.g., a row in FIG. 2) corresponding to the reference hash key 204 matched to the metered hash key 104. In some examples, the meter ID 108, the panelist ID 304, and the timestamp 306 are sent by the media meter 100 to the AME 106 (FIG. 1) with one or more metered hash keys 104. For example, the media meter 100 may send metered hash keys 104 one at a time to the AME 106 in real time or in near real time, or may send multiple hash keys 104 in batches from time to time. In the illustrated example, the timestamp 306 represents the time that a panelist (e.g., the panelist associated with the panelist ID 304) was exposed to the portion of the media 102 (FIG. 1) corresponding to the metered hash key 104.

Figure 4:
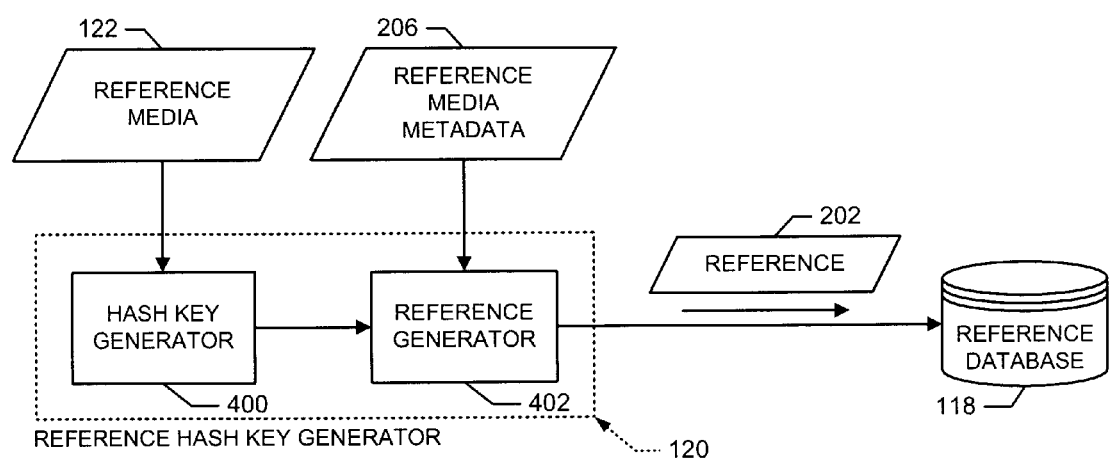
FIG. 4 illustrates an example implementation of the example reference hash key generator of FIG. 1 which may be used to generate the example reference records of FIG. 2.

FIG. 4 illustrates an example implementation of the reference hash key generator 120 of FIG. 1. The example reference hash key generator 120 of FIG. 4 generates reference records 202 (FIG. 2) for the example reference database 118. In the illustrated example of FIG. 4, the reference hash key generator 120 includes an example hash key generator 400 and an example reference generator 402. The example hash key generator 400 samples reference media 122 (FIGS. 1 and 4) at a sampling frequency (e.g., 16 Hz, 32 Hz, 64 Hz, etc.). In the illustrated example, the hash key generator 400 generates reference hash keys (e.g., reference hash keys 204 of FIG. 2) based on the collected samples. The example reference generator 402 receives or retrieves the reference hash keys 204, and generates reference records 202 (FIG. 2) to store the reference hash keys. For example, the reference generator 402 stores the reference hash key 204 in association with the reference metadata 206 (FIG. 2), the previous reference hash key 208, and the next reference hash key 210 as shown in the example reference records 202. In some examples, the reference media metadata 206 is embedded or linked to by in the reference media 122. In some examples, the reference metadata 206 is entered separately for each reference media 122. The example reference generator 402 stores the example reference record 202 in the reference database 118. In some examples, the reference record 202 is added to the reference database 118 individually after the reference record 202 is created. In some examples, the reference records 202 for an entire reference media 122 are added to the reference database 118 as a batch after all of the reference record 202 are created for that reference media 122.

While an example manner of implementing the reference hash key generator 120 of FIG. 1 is illustrated in FIG. 4, one or more of the elements, processes and/or devices illustrated in FIG. 4 may be combined, divided, re-arranged, omitted, eliminated and/or implemented in any other way. Further, the example hash key generator 400, the example reference generator 402 and/or, more generally, the example reference hash key generator 120 of FIG. 1 may be implemented by hardware, software, firmware and/or any combination of hardware, software and/or firmware. Thus, for example, any of the example hash key generator 400, the example reference generator 402 and/or, more generally, the example reference hash key generator 120 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hash key generator 400, the example reference generator 402 and/or, the example reference hash key generator 120 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example reference hash key generator 120 of FIG. 1 may include one or more elements, processes and/or devices in addition to, or instead of, those illustrated in FIG. 4, and/or may include more than one of any or all of the illustrated elements, processes and devices.

Figure 5:
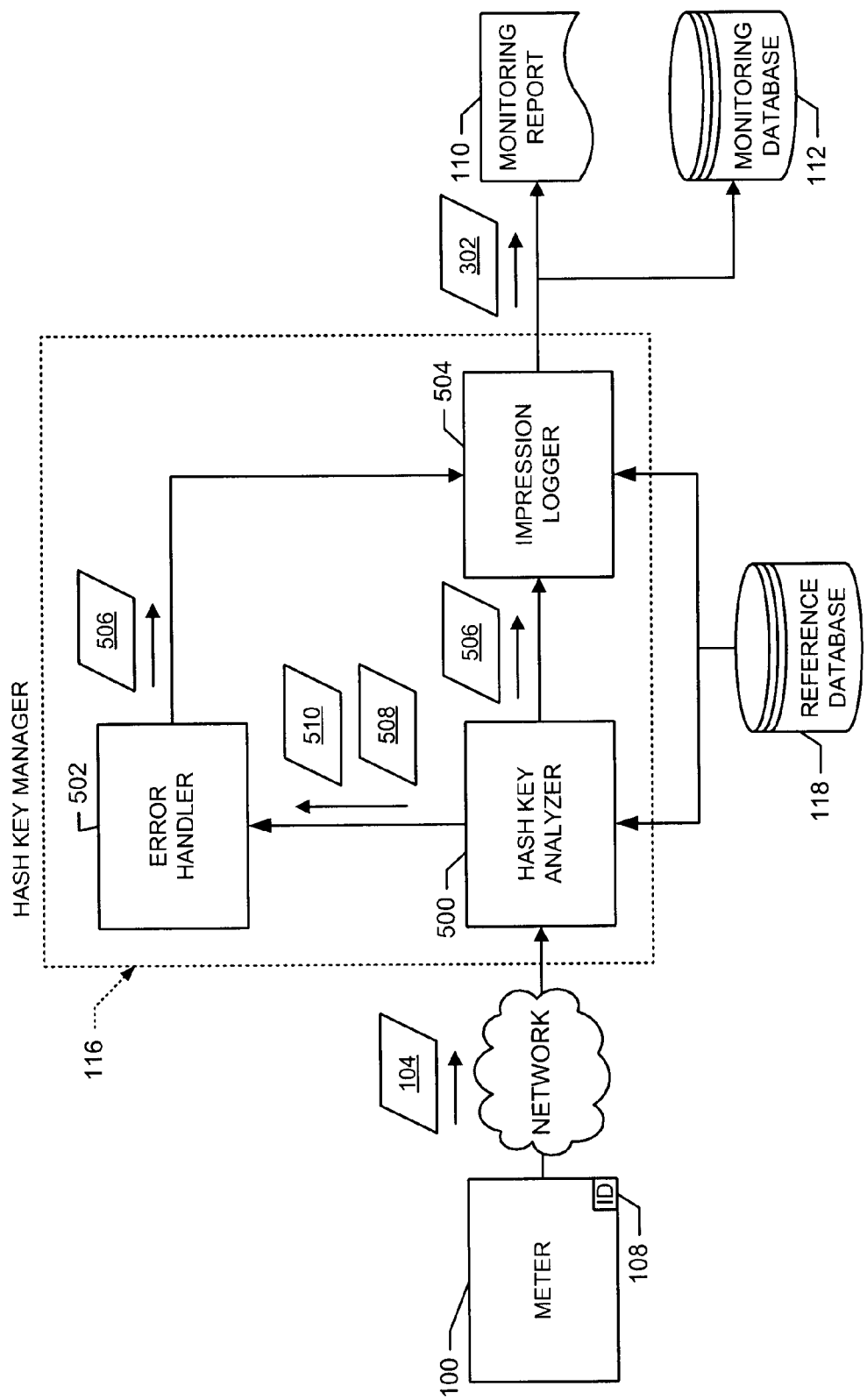
FIG. 5 illustrates an example implementation of the example hash key manager of FIG. 1 which may be used to compare metered hash keys with reference hash keys to generate a monitoring report and/or to store impressions in a monitoring database.

FIG. 5 illustrates an example implementation of the hash key manager 116 of FIG. 1. The example hash key manager 116 of FIG. 5 processes metered hash keys 104 to measure impressions, generate monitoring reports (e.g., the example monitoring report 110) and/or store impression records (e.g., the example impression records 302 of FIG. 3) in a monitoring database (e.g., the example monitoring database 112). In the illustrated example of FIG. 5, the hash key manager 116 includes an example hash key analyzer 500, an example error handler 502, and an example impression logger 504. The purpose of the hash key analyzer 500 of the example illustrated in FIG. 5 is to determine whether a metered hash key is valid or invalid. The example hash key analyzer 500 of FIG. 5 receives or retrieves metered hash keys 104 from the media meter 100. In some examples, the hash key analyzer 500 also receives or retrieves the meter ID 108 from the media meter 100 and/or other identifying information (e.g., demographics, panelist identifier (ID), etc.) regarding one or more panelists exposed to the media 102 and/or information identifying people in the audience (e.g., from the people meter 109 of FIG. 1). The example hash key analyzer 500 of the illustrated example retrieves the example media reference hash keys 204 (FIG. 2) from the example reference database 118 (FIG. 1) to compare with the example metered hash key 104.

In the example illustrated in FIG. 5, when the hash key analyzer 500 detects a match between one of the metered hash keys 104 and a reference hash key 204 (FIG. 2), the hash key analyzer 500 designates the matching metered hash key 104 as a valid hash key 506. The example hash key analyzer 500 of FIG. 5 provides the example valid hash key 506 to the example impression logger 504. In the example illustrated in FIG. 5, when the hash key analyzer 500 does not detect a match between one of the metered hash keys 104 and a reference hash key 204 (FIG. 2), the hash key analyzer 500 designates the non-matching metered hash key 104 as an invalid hash key 508. The example hash key analyzer 500 provides the example error handler 502 with the example invalid hash key 508.

For the purpose of recovering an invalid hash key (e.g., determining what the invalid hash key should have been), the hash key analyzer 500 of the illustrated example selects a potential hash key based on the preceding or adjacently preceding metered hash key (e.g., the previous metered hash key 104b of FIG. 1) and/or the following or adjacently following metered hash key (e.g., the next metered hash key 104c of FIG. 1). Determining whether the potential hash key and the invalid hash key are sufficiently close is discussed in further detail below in connection with FIG. 7. Additionally or alternatively, for the purpose of reducing search time and expediting comparisons to find matches to reference hash keys, the hash key analyzer 500 of the illustrated example operates to predict a next matching reference hash key based on a current match. For example, upon determining a valid match (e.g., a valid hash key 506), the hash key analyzer 500 references the next reference hash key to determine whether the next metered hash key is valid instead of querying the reference database 118 with an altogether new search. In this way, knowledge obtained from a valid match is leveraged to advantageously reduce search time.

In the example illustrated in FIG. 5, the hash key analyzer 500 determines a potential hash key 510. In some examples, the potential hash key 510 is based on the previous metered hash key 104b (FIG. 1). In such examples, the hash key analyzer 500 retrieves the reference record 202 of a reference hash key 204 corresponding to the previous metered hash key 104b. In such examples, the hash key analyzer 500 designates the next reference hash key 210 (FIG. 2) of the retrieved reference record 202 as the potential hash key 510. In some examples, the potential hash key 510 is based on the next metered hash key 104c (FIG. 1). In such examples, the hash key analyzer 500 retrieves the reference record 202 of a reference hash key 204 corresponding to the next metered hash key 104c. In such examples, the hash key analyzer 500 designates the previous reference hash key 208 (FIG. 2) of the retrieved reference record 202 as the potential hash key 510. In some examples, the potential hash key 510 corresponding to the previous metered hash key 104b cannot be retrieved (e.g., the previous metered hash key 104b is invalid, etc.), the hash key analyzer 500 attempts to retrieved a potential hash key 510 corresponding to the next metered hash key 104c. The example hash key analyzer 500 provides the example potential hash key 510 to the example error handler 502.

In the example illustrated in FIG. 5, the error handler 502 processes the invalid hash key 508 and the potential hash key 510 to determine whether the potential hash key 510 sufficiently matches (e.g., is within a permissible threshold of) the invalid hash key 508. The example error handler 502 of FIG. 5 receives or retrieves the example invalid hash key 508 and the example potential hash key(s) 510 from the example hash key analyzer 500. The example error handler 502 compares the example invalid hash key 508 and an example potential hash key 510. If the difference between the example invalid hash key 508 and the example potential hash key 510 satisfies an example threshold (e.g., the difference is less than or equal to the threshold), the example error handler 502 designates the example potential hash key 510 as the example valid hash key 506. Satisfying the threshold is discussed in more detail below in connection with FIG. 7. In the illustrated example of FIG. 5, the error handler provides the valid hash key 506 to the impression logger 504. In some examples, if the difference between the invalid hash key 508 and the potential hash key 510 is above the threshold (e.g., the hash keys are too different from one another), the error handler 502 discards the invalid hash key 508. In some examples, if the hash key analyzer 500 used the previous metered hash key 104b and the error handler 502 discarded the invalid hash key 508, the hash key analyzer 500 selects an additional potential hash key 510 using the next metered hash key 104c. In such examples, the error handler 502 processes the additional potential hash key 510 as described above.

In the example illustrated in FIG. 5, the impression logger 504 receives or retrieves the valid hash key 506 from the hash key analyzer 500 and/or the error handler 502. In the illustrated example, the impression logger 504 retrieves reference metadata 206 (FIG. 2) corresponding to the valid hash key 506 from the reference database 118. The example impression logger 504 of FIG. 5 associates the example reference metadata 204 with an example impression record 302. In some examples, the impression logger 504 stores the meter ID 106 in association with the impression record 302. In the illustrated example of FIG. 5, the impression logger 504 adds the impression record 302 to the monitoring report 110 (FIG. 1) and/or stores the impression record 302 into the monitoring database 112 (FIG. 1).

While an example manner of implementing the hash key manager 116 of FIG. 1 is illustrated in FIG. 5, one or more of the elements, processes and/or devices illustrated in FIG. 5 may be combined, divided, re-arranged, omitted, eliminated and/or implemented in any other way. Further, the example hash key analyzer 500, the example error handler 502, the example impression logger 504 and/or, more generally, the example hash key manager 116 of FIG. 1 may be implemented by hardware, software, firmware and/or any combination of hardware, software and/or firmware. Thus, for example, any of the example hash key analyzer 500, the example error handler 502, the example impression logger 504 and/or, more generally, the example hash key manager 116 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hash key analyzer 500, the example error handler 502, the example impression logger 504 and/or, the example hash key manager 116 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example hash key manager 116 of FIG. 1 may include one or more elements, processes and/or devices in addition to, or instead of, those illustrated in FIG. 5, and/or may include more than one of any or all of the illustrated elements, processes and devices.

Figure 6A:
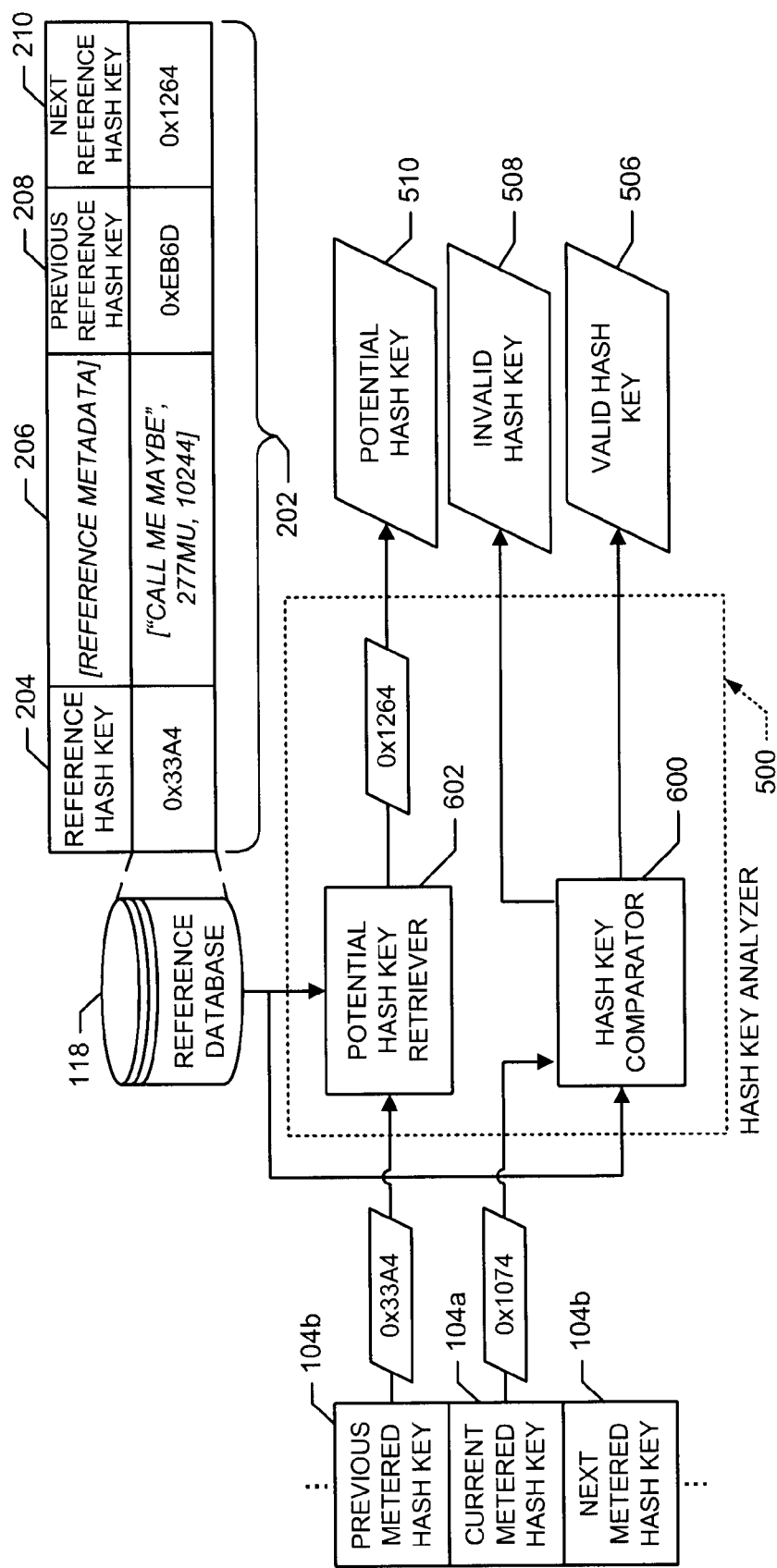
FIGS. 6A and 6B illustrate example configurations of the example hash key analyzer of FIG. 5 to compare metered hash keys to reference hash keys and/or to detect errors in metered hash keys.
Figure 6B:
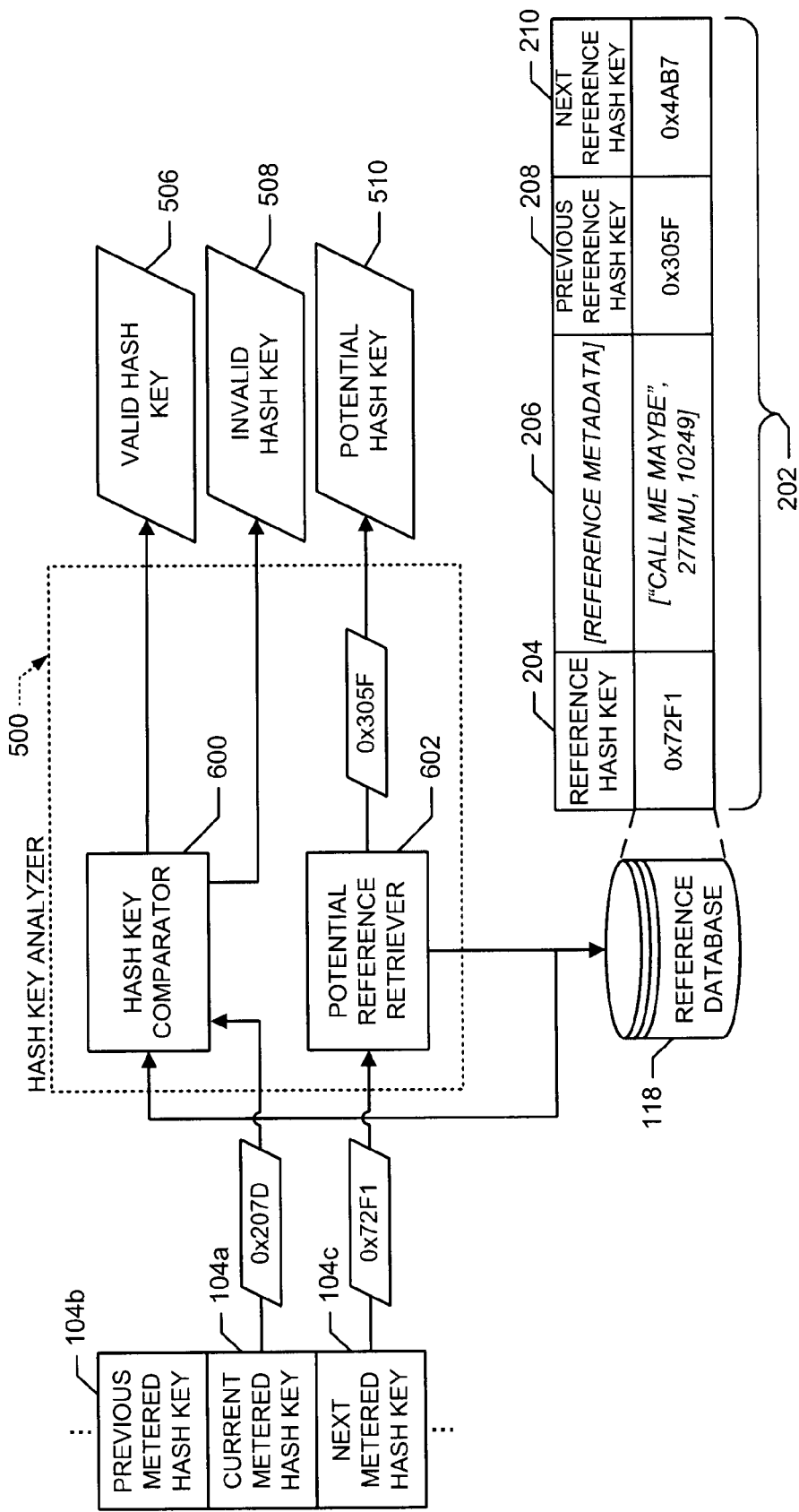

FIGS. 6A and 6B illustrate different example configurations of the example hash key analyzer 500 of FIG. 5. The example hash key analyzer 500 configurations shown in FIGS. 6A and 6B determine whether the metered hash key is valid, and, select a potential hash key to be used to recover the metered hash key when the metered hash key is invalid. In the example illustrated in FIG. 6A, the example hash key analyzer 500 uses a adjacently preceding metered hash key as the potential hash key. In the example illustrated in FIG. 6B, the example hash key analyzer 500 uses an adjacently following metered hash key to select a potential hash key. In the illustrated examples, the hash key analyzer 500 is provided with an example hash key comparator 600 and an example potential hash key retriever 602.

The example hash key comparator 600 of FIGS. 6A and 6B receives or retrieves a current metered hash key 104a to be processed. In the illustrated example, the hash key comparator 600 queries the reference database 118 (FIG. 1) for a reference hash key 204 to compare with the current metered hash key 104a. In the illustrated example, the query submitted by the hash key comparator 600 performs a compare operation that retrieves a reference hash key 204 that matches the current metered hash key 104a by using the current metered hash key 104a as a query parameter. If the example hash key comparator 600 determines, based on the query, that the current metered hash key 104a matches a reference hash key 204 associated with a reference record 202 in the reference database 118, the hash key comparator 600 designates the current metered hash key 104a as a valid hash key 506 (FIG. 5). In the illustrated example of FIGS. 6A and 6B, if the query submitted to the reference database 118 does not return a value (e.g., the reference database returns a NULL value, etc.) and/or if the query otherwise indicates that the current metered hash key 104a is not found in the reference database 118, the hash key comparator 600 determines that the current metered hash key 104a does not match a reference hash key 204. In such instances, the hash key comparator 600 designates the current metered hash key as an invalid hash key 508 (FIG. 5).

In the example illustrated in FIG. 6A, the potential hash key retriever 602 determines whether the previous metered hash key 104b is in the reference database 118. In some examples, the potential hash key retriever 602 stores information indicating whether the previous metered hash key 104b was valid (e.g., a reference hash key 204 was identified for the previous metered hash key 104b in a previous iteration of metered hash key comparisons). If the example previous metered hash key 104b was valid, the example potential hash key retriever 602 retrieves an example reference record 202 corresponding to the example previous metered hash key 104b. The example potential hash key retriever 602 designates the next reference hash key 210 (FIG. 2) stored in association with the retrieved reference record 202 as the potential hash key 510.

In the example illustrated in FIG. 6B, the potential hash key retriever 602 determines whether the next metered hash key 104c matches a reference hash key 202 in the reference database 118. If the next metered hash key 104c matches a reference hash key 204, the potential hash key retriever 602 retrieves a reference record 202 corresponding to the next metered hash key 104c. The example potential hash key retriever 602 designates the previous reference hash key 208 stored in association with the retrieved reference record 202 as the potential hash key 510. In the examples illustrated in FIGS. 6A and 6B, if the potential hash key retriever 602 does not designate the current metered hash key 104a as valid or does not designate a potential hash key 510, the current hash key 104a is discarded.

While an example manner of implementing the hash key analyzer 500 of FIG. 5 is illustrated in FIGS. 6A and 6B, one or more of the elements, processes and/or devices illustrated in FIGS. 6A and 6B may be combined, divided, re-arranged, omitted, eliminated and/or implemented in any other way. Further, the example hash key comparator 600, the example potential hash key retriever 602 and/or, more generally, the example hash key analyzer 500 of FIG. 5 may be implemented by hardware, software, firmware and/or any combination of hardware, software and/or firmware. Thus, for example, any of the example hash key comparator 600, the example potential hash key retriever 602 and/or, more generally, the example hash key analyzer 500 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hash key comparator 600, the example potential hash key retriever 602 and/or the example hash key analyzer 500 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example hash key analyzer 500 of FIG. 5 may include one or more elements, processes and/or devices in addition to, or instead of, those illustrated in FIGS. 6A and 6B, and/or may include more than one of any or all of the illustrated elements, processes and devices.

Figure 7:
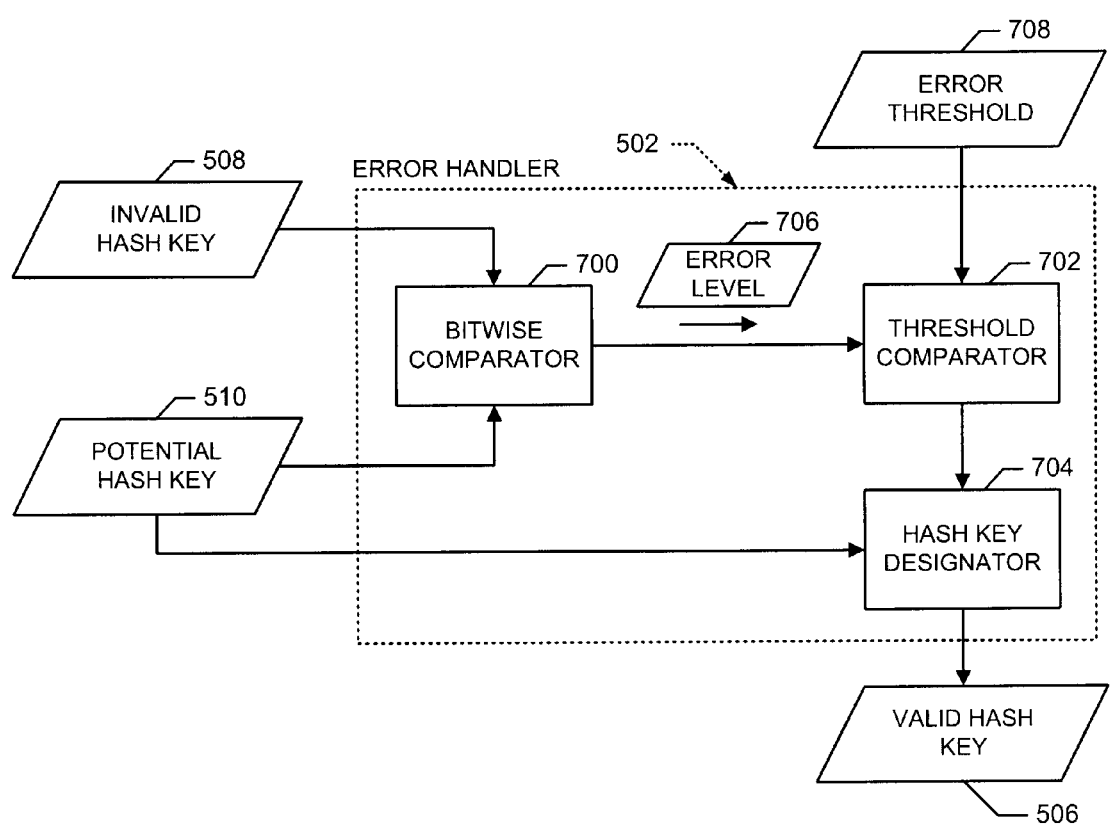
FIG. 7 illustrates an example implementation of the example error handler of FIG. 5 to correct errors in metered hash keys.

FIG. 7 illustrates an example implementation of the example error handler 502 of FIG. 5. The example error handler 502 determines whether an invalid hash key is recoverable (e.g., a potential hash key sufficiently matches the invalid hash key). The example error handler 502 illustrated in FIG. 7 is provided with an example bitwise comparator 700, an example threshold comparator 702 and an example hash key designator 704. In the illustrated example, the bitwise comparator 700 receives or retrieves the invalid hash key 508 (FIG. 5) and the potential hash key 510 (FIG. 5) from the hash key analyzer 500 (FIGS. 5, 6A, and 6B). The example bitwise comparator 700 of this example calculates an error level 706 (e.g., an error value)

by comparing the corresponding bits in the example invalid hash key 508 to bits in the example potential hash key 510. The example error level 706 is indicative of the number of bits that are not identical between the invalid hash key 508 and the potential hash key 510. In some examples, the example bitwise comparator 700 performs a bitwise operation (e.g., a bitwise exclusive OR (XOR) operation, a bitwise exclusive NOR (XNOR) operation, etc.) on the example invalid hash key 508 and the example potential hash key 510. In some examples, the error level 706 is determined using Equation (1) below.

$$\text{Error Level} = \text{BitCount}(HK_I \oplus HK_P) \quad \text{Equation (1)}$$

In Equation (1) above, $HK_I$ is the invalid hash key 508, $HK_P$ is the potential hash key 510, and the BitCount( ) function returns the number of ones in a binary number. In the illustrated example, using a bitwise XOR operation, a one in a particular bit position indicates that corresponding bits of the invalid hash key 508 and the potential hash key 510 in the same bit position are not matching bits (e.g., a bit in the invalid hash key 508 is set to 1 and a corresponding bit in the potential hash key 510 is set to 0). For example, as shown below in Table (1), for an invalid hash key 508 having a hexadecimal value of 0x1074 and a potential hash key 510 having a hexadecimal value of 0x1264, the error level 706 is 2 (BitCount(0x1074 $\oplus$ 0x1264)=2) because two bit positions have non-matching values.

TABLE (1)

|  | Hexadecimal | Binary |
|---|---|---|
| XOR | 0x1074 | 0001 0000 0111 0100 |
|  | 0x1264 | 0001 0010 0110 0100 |
|  | 0x0210 | 0000 0010 0001 0000 |

In the example illustrated in FIG. 7, the threshold comparator 702 compares the error level 706 to an error threshold 708. In some examples, the example error threshold 708 is set by the example AME 106 (FIG. 1) to identify a number of errors that may be in the example metered hash key 104 (FIG. 1) while still considered a match. In some examples, the error threshold 706 may be set to 10% of the bit length of the metered hash key 104 (e.g., an error threshold of 6 would be selected for a 64-bit metered hash key 104). If the example error level 706 is less than or equal to the error threshold 708 (e.g., the error level 706 satisfies the error threshold 708), the hash key designator 704 designates the potential hash key 510 as a valid hash key 506 (FIG. 4). If the example error level 706 is greater than the error threshold 708 (e.g., the error level 706 does not satisfy the error threshold 708), the match is sufficient and the hash key designator 704 does not designate a potential hash key 510. In some examples, the hash key designator 704 sets the potential hash key 510 to a NULL value when the error threshold 708 is not satisfied.

While an example manner of implementing the error handler 502 of FIG. 5 is illustrated in FIG. 7, one or more of the elements, processes and/or devices illustrated in FIG. 7 may be combined, divided, re-arranged, omitted, eliminated and/or implemented in any other way. Further, the example bitwise comparator 700, the example threshold comparator 702, the example hash key designator 704 and/or, more generally, the example error handler 502 of FIG. 5 may be implemented by hardware, software, firmware and/or any combination of hardware, software and/or firmware. Thus, for example, any of the example bitwise comparator 700, the example threshold comparator 702, the example hash key designator 704 and/or, more generally, the example error handler 502 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example bitwise comparator 700, the example threshold comparator 702, the example hash key designator 704 and/or the example error handler 502 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example error handler 502 of FIG. 5 may include one or more elements, processes and/or devices in addition to, or instead of, those illustrated in FIG. 7, and/or may include more than one of any or all of the illustrated elements, processes and devices.

Figure 8:
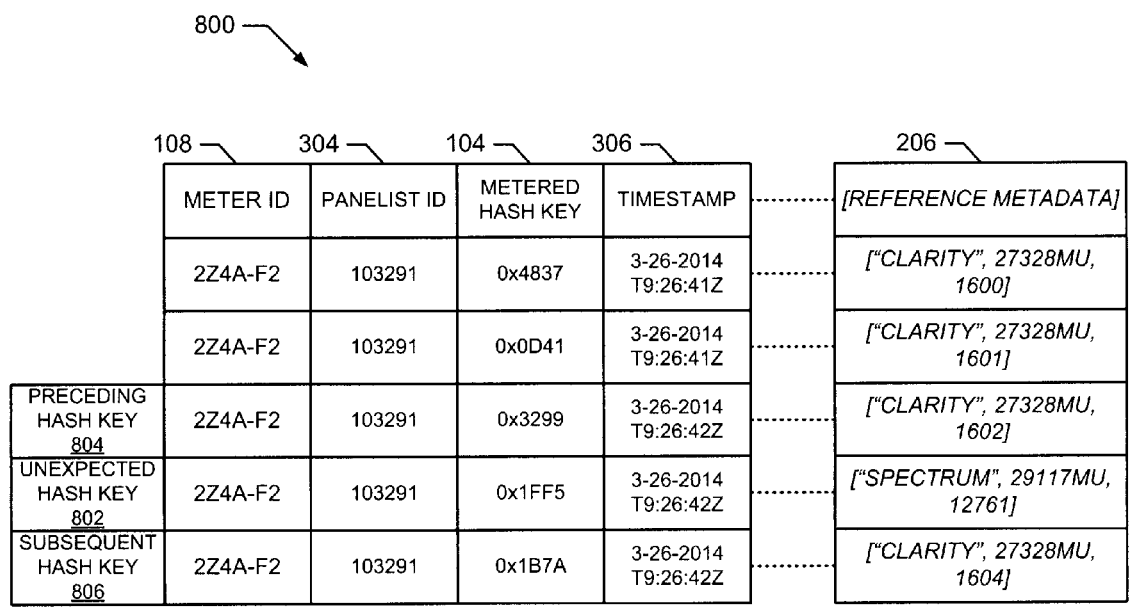
FIG. 8 illustrates an example data structure that may be used to store metered hash keys generated by the media meter of FIG. 1 to detect unexpected hash keys.

FIG. 8 illustrates an example data structure 800 that may be used to store metered hash keys (e.g., the metered hash keys 104 of FIG. 1) generated by the media meter 100 of FIG. 1 to detect unexpected hash keys. In the illustrated example of FIG. 8, the data structure 800 includes a meter ID 108, a panelist ID 304, a metered hash key 104 and a timestamp 306. In some examples, when unexpected hash keys are detected and/or corrected in post-processing (e.g., the metered hash keys 104 have already been processed by the hash key manager 116 of FIG. 1), the data structure 800 may include reference metadata 206 retrieved from the reference database 118 (FIG. 1). In some examples, when unexpected hash keys are detected and/or corrected while processing the metered hash keys 104, the reference metadata 206 is retrieved from the reference database 118.

In the example illustrated in FIG. 8, an unexpected hash key 802 is a metered hash key 104 that is associated with reference metadata 206 that is unexpectedly different (e.g., a different media ID, a non-sequential sample number, etc.) from the reference metadata 206 of the preceding hash key 804 and/or the subsequent hash key 806. For example, if the reference metadata 206 of the preceding hash key 804 is [Title: Clarity, Media ID: 27328MU, Sample No.: 1602], the expected value of the reference metadata 206 associated with the next metered hash key 104 would be [Title: Clarity, Media ID: 27328MU, Sample No.: 1603] (e.g. the next sequential sample of the media presentation 100 of FIG. 1). In that example, if the reference metadata 206 of the next metered hash key 104 is [Title: Spectrum, Media ID: 29117MU, Sample No.: 12761], the metered hash key would be determined to be an unexpected hash key 802. In some examples, unexpected hash keys 802 occur because error is introduced into the metered hash key 104. In some examples, unexpected hash keys 802 occur because a different media presentation 100 is metered (e.g., a panelist changes the media presentation 100, etc.).

In some examples, the hash key manager 116 (FIG. 1) determines whether the unexpected hash key 802 is the result of error by calculating an error level (e.g., the error level 706 of FIG. 7) between the unexpected hash key 802 and a potential reference hash key (e.g., the potential reference hash key 510 of FIG. 5) retrieved from the preceding hash key 804 and/or the subsequent hash key 806. If the error level satisfies an error threshold (e.g., the error threshold 708 of FIG. 7) (e.g., the error level is less than or equal to the error threshold), the potential hash key replaces the unexpected hash key 802. Otherwise, a channel change event or the like is considered to have been identified and the unexpected hash key 802 is not replaced.

Figure 9:
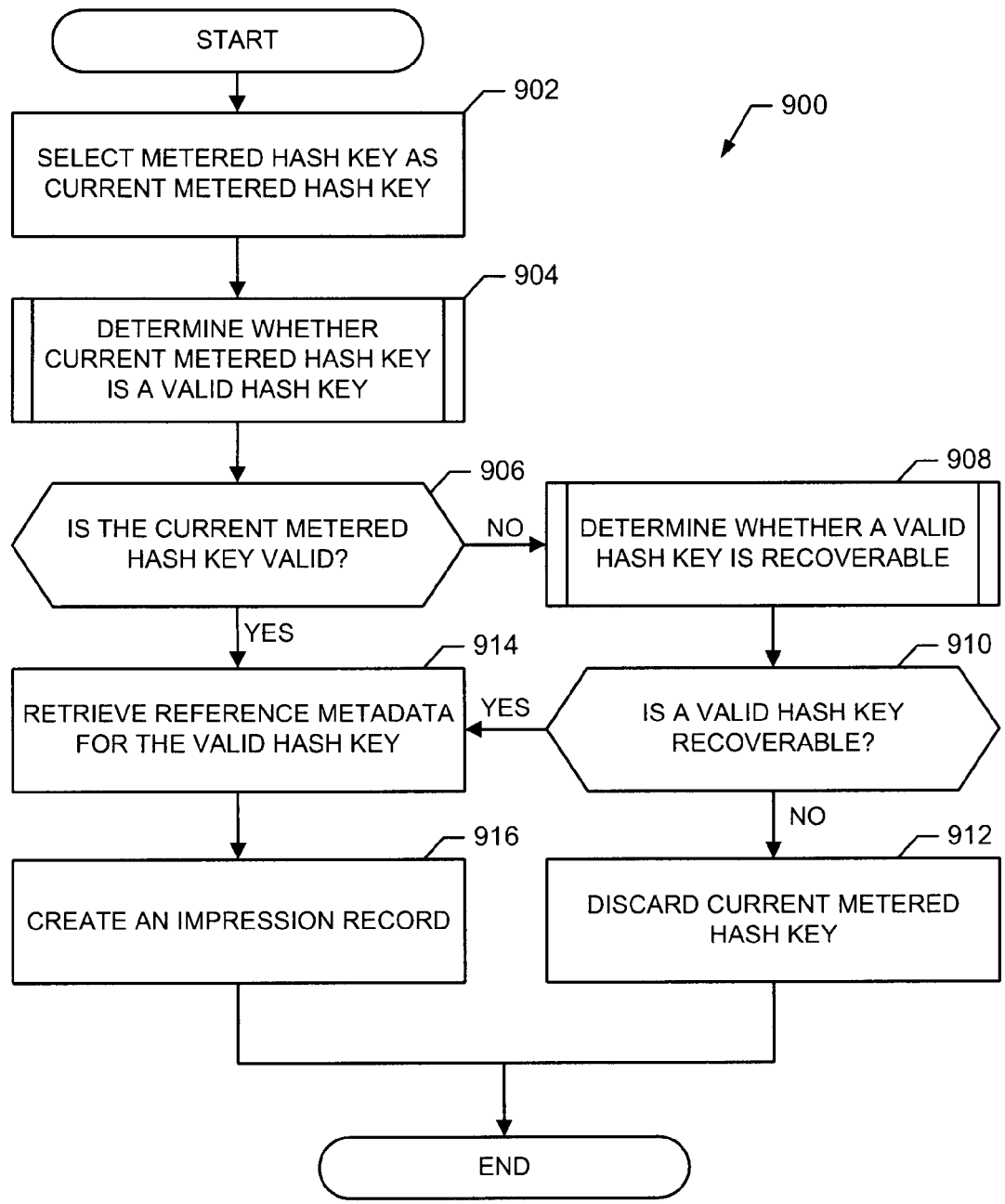
FIG. 9 is a flow diagram representative of example machine readable instructions that may be executed to implement the hash key manager of FIGS. 1 and/or 5 to compare metered hash keys to reference hash keys.
Figure 11:
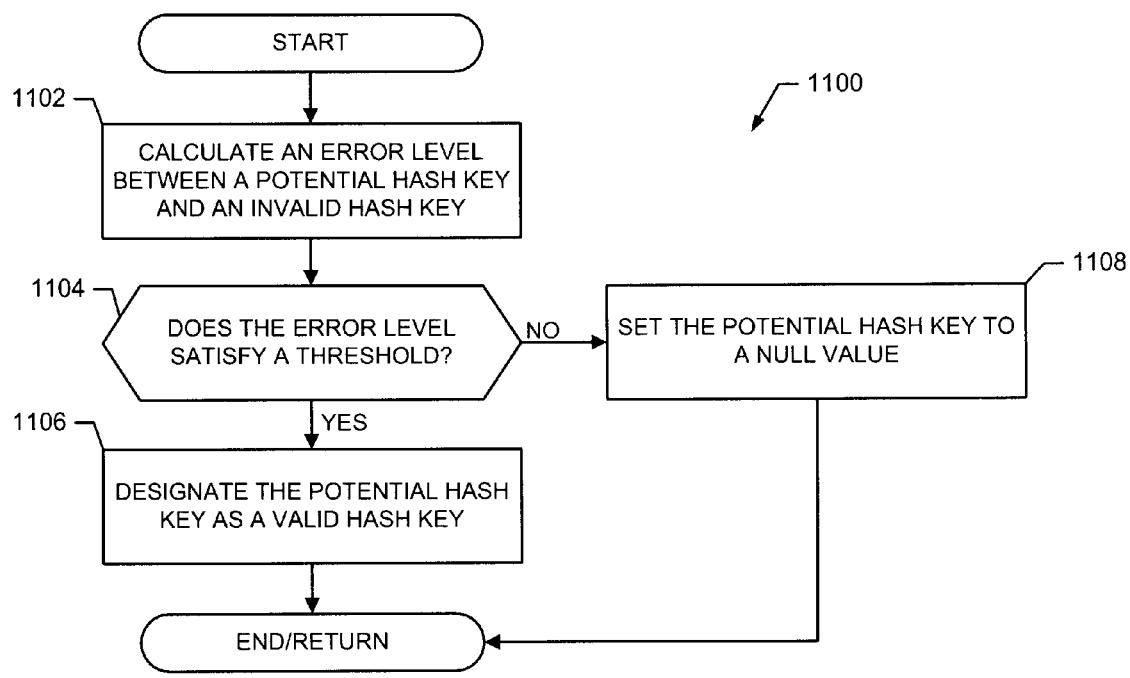
FIG. 11 is a flow diagram representative of example machine readable instructions that may be executed to implement the error handler of FIG. 7 to recover invalid hash keys.
Figure 12A:
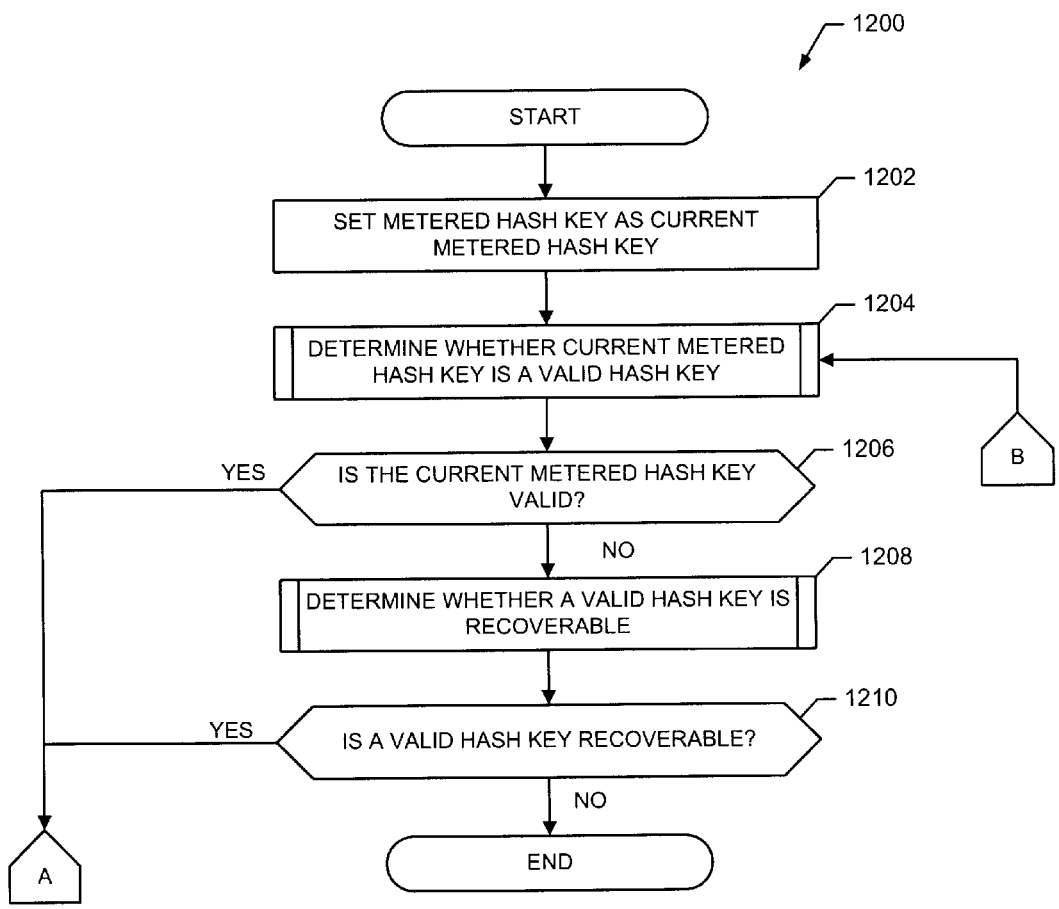
FIGS. 12A and 12B are a flow diagram representative of example machine readable instructions that may be executed to implement the hash key analyzer, the error handler, and/or the exposure creditor of FIGS. 5, 6A, 6B and/or 7 to compare metered hash keys to reference hash keys.
Figure 12B:
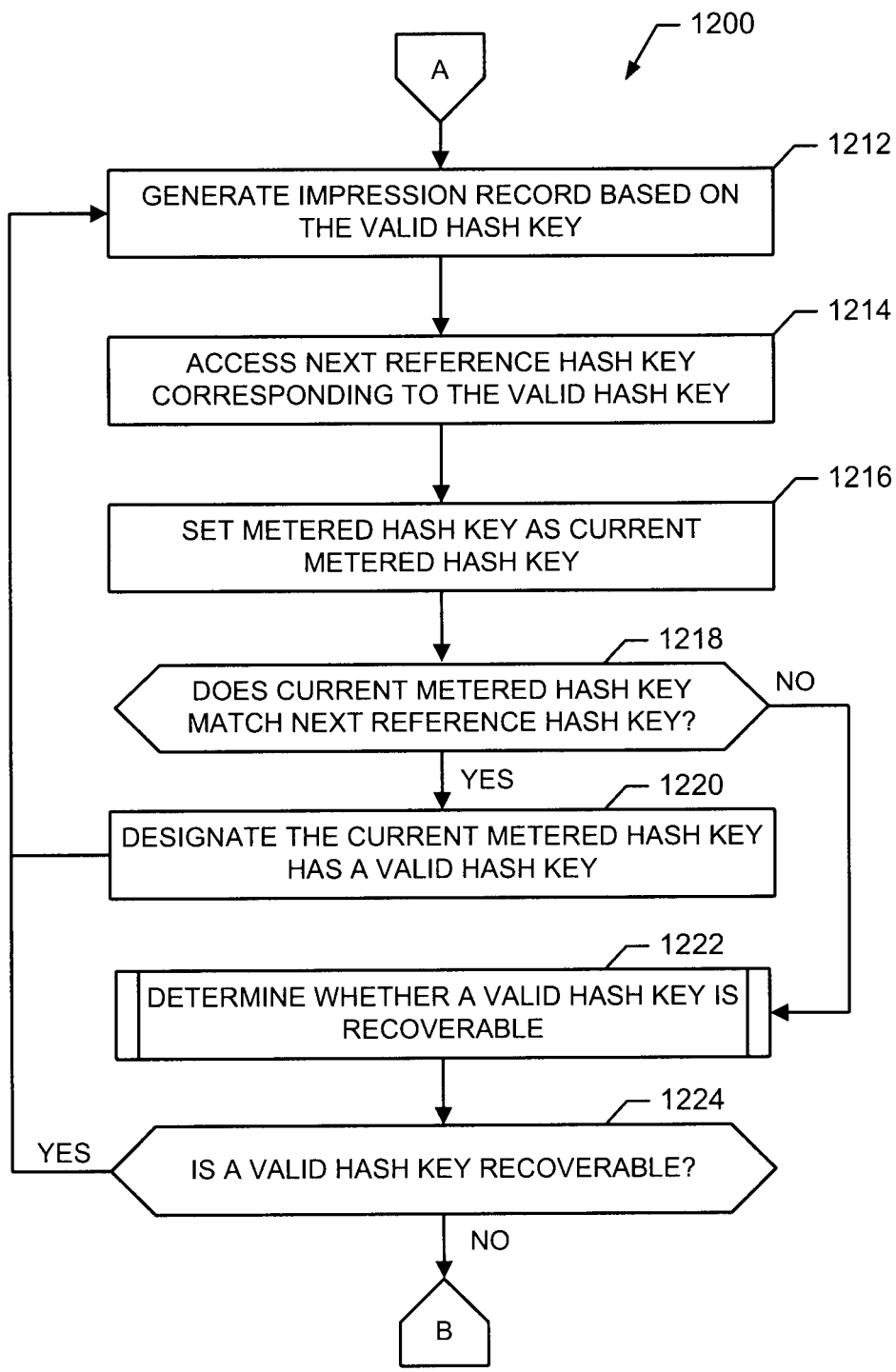
Figure 13:
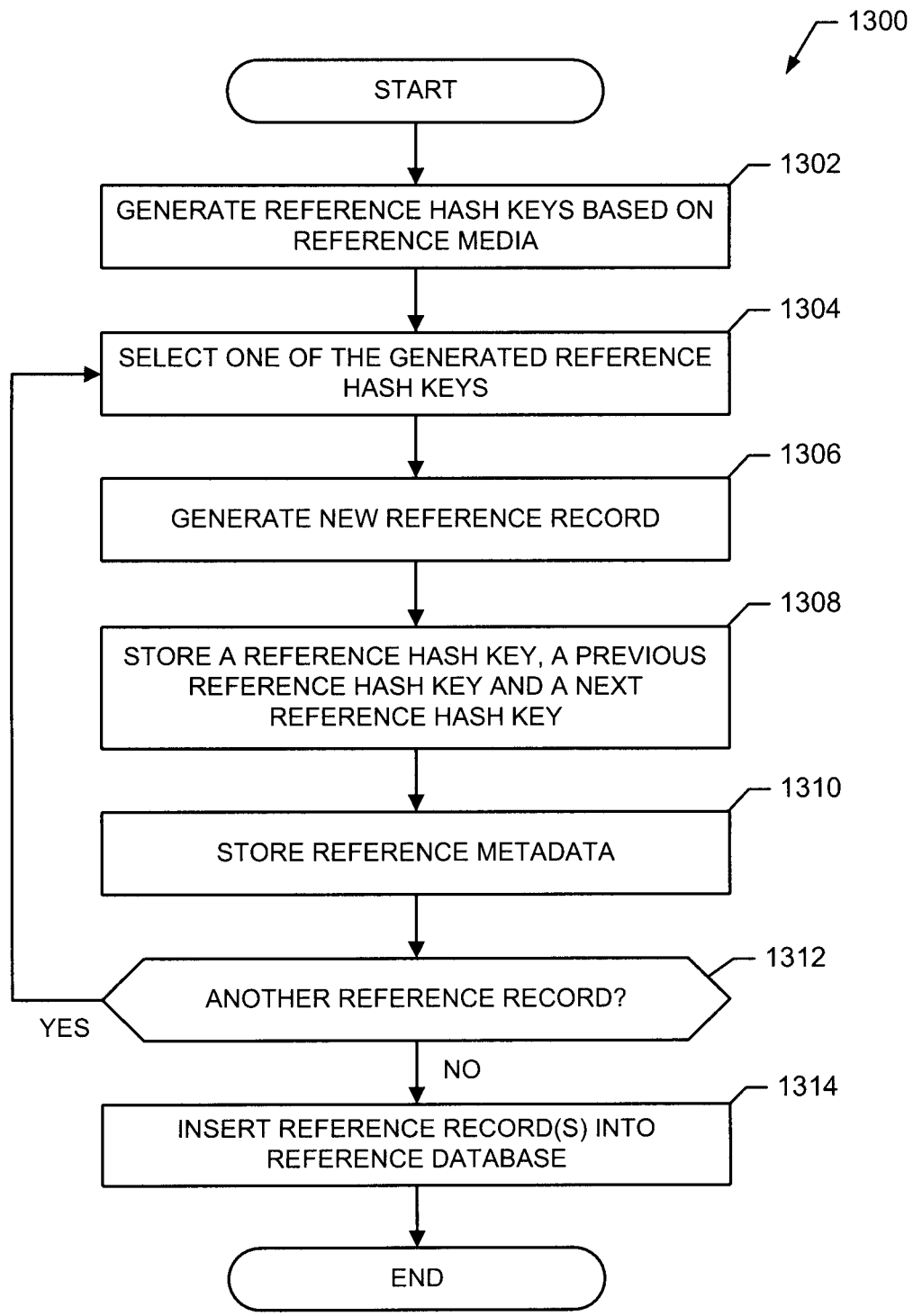
FIG. 13 is a flow diagram representative of example machine readable instructions that may be executed to implement the reference hash key generator of FIGS. 1 and/or 4 to generate the reference records of FIG. 2.
Figure 14:
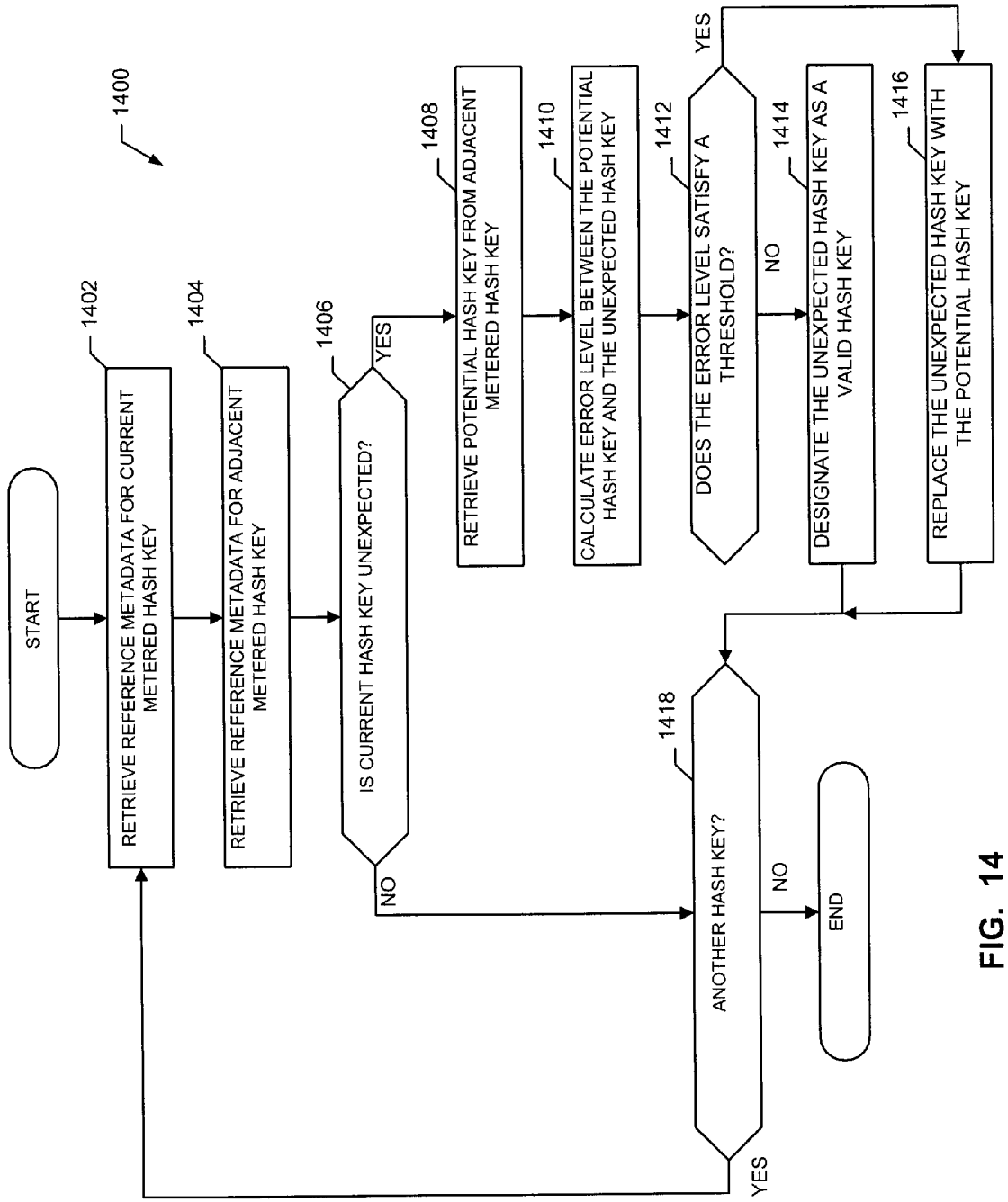
FIG. 14 is a flow diagram representative of example machine readable instructions that may be executed to implement the hash key manager of FIGS. 1 and 5 to detect and/or correct unexpected hash keys.

A flowchart representative of example machine readable instructions for implementing the example hash key manager 116 of FIGS. 1 and 5 is shown in FIG. 9. A flowchart representative of example machine readable instructions for implementing the example hash key analyzer 500 of FIGS. 6A and 6B is shown if FIG. 10. A flowchart representative of example machine readable instructions for implementing the example error handler 502 of FIGS. 5 and 7 is shown in FIG. 11. A flowchart representative of example machine readable instructions for implementing the example hash key analyzer 500 of FIGS. 5, 6A and 6B, the example error handler 502 of FIGS. 5 and 7 and/or the example impression logger 504 of FIG. 5 is shown in FIGS. 12A and 12B. A flowchart representative of example machine readable instructions for implementing the example reference hash key generator 120 of FIGS. 1 and 4 is shown in FIG. 13. A flow chart representative of machine readable instructions for implementing the example hash key manager 116 of FIGS. 1 and 5 is shown in FIG. 14. In these examples, the machine readable instructions comprise one or more program(s) for execution by a processor such as the processor 1512 shown in the example processor platform 1500 discussed below in connection with FIG. 15. The program(s) may be embodied in software stored on a tangible computer readable storage medium such as a CD-ROM, a floppy disk, a hard drive, a digital versatile disk (DVD), a Blu-ray disk, or a memory associated with the processor 1512, but the entire programs and/or parts thereof could alternatively be executed by a device other than the processor 1512 and/or embodied in firmware or dedicated hardware. Further, although the example program(s) is/are described with reference to the flowcharts illustrated in FIGS. 9, 10, 11, 12A, 12B, 13 and 14, many other methods of implementing the example hash key manager 116 and the example reference hash key generator 120 may alternatively be used. For example, the order of execution of the blocks may be changed, and/or some of the blocks described may be changed, eliminated, or combined.

As mentioned above, the example process(es) of FIGS. 9, 10, 11, 12A, 12B, 13 and 14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals, to exclude transitory signals, and to exclude transmission media. As used herein, "tangible computer readable storage medium" and "tangible machine readable storage medium" are used interchangeably. Additionally or alternatively, the example process(es) of FIGS. 9, 10, 11, 12A, 12B, 13, and 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals, to exclude transitory signals, and to exclude transmission media. As used herein, when the phrase "at least" is used as the transition term in a preamble of a claim, it is open-ended in the same manner as the term "comprising" is open ended.

An example program 900 of FIG. 9 is executed to implement the example hash key manager 116 of FIGS. 1 and 5 to generate impression records (e.g., the impression records 302 of FIG. 3) based on one or more metered hash key(s) 104 (FIG. 1) received from the media meter 100 (FIG. 1). The impression records 302 are used to generate monitoring reports 110 (FIG. 1) and/or to maintain a monitoring database 112 (FIG. 1). Initially, at block 902, the example hash key analyzer 500 (FIG. 5) selects a metered hash key 104 as a current metered hash key 104a (FIG. 1). At block 904, the example hash key analyzer 500 determines whether the current metered hash key 104a is a valid hash key (e.g., the valid hash key 506 of FIG. 5). An example process that may be used to implement block 904 to determine whether a current metered hash key 104a is valid is described below in connection with FIG. 10.

At block 906, if the current metered hash key 104a is not a valid hash key 506, program control proceeds to block 908. Otherwise, if the current metered hash key 104a is a valid hash key 506, program control proceeds to block 914. At block 908, the example error handler 502 determines whether a valid hash key 506 is recoverable from the invalid current metered hash key 104a. An example process that may be used to implement block 908 to determine whether a valid hash key 506 is recoverable from the invalid current metered hash key 104a is described below in connection with FIG. 11. At block 910, if a valid hash key 506 was recoverable (block 908), program control proceeds to block 914. If a valid hash key 506 was not recoverable (block 908), program control proceeds to block 912, at which the example error handler 502 discards the current metered hash key 104a. The example program 900 then ends.

At block 914, the example impression logger 504 retrieves reference metadata (e.g., reference metadata 206 of FIG. 2) from the reference database 118 (FIG. 1) corresponding to the valid hash key 506 detected at block 904 or block 908. At block 916, the example impression logger 504 generates an impression record (e.g., the impression record 302 of FIG. 3) based on the reference metadata 206 retrieved at block 914. For example, the hash key manager 116 may store a meter ID 108 (FIG. 1), a panelist ID 304 (FIG. 3), audience identifying information (e.g., from the people meter 109 of FIG. 1), and/or a timestamp 306 (FIG. 3) in association with the reference metadata 206 in the impression record 302. The example program 900 then ends.

Figure 10:
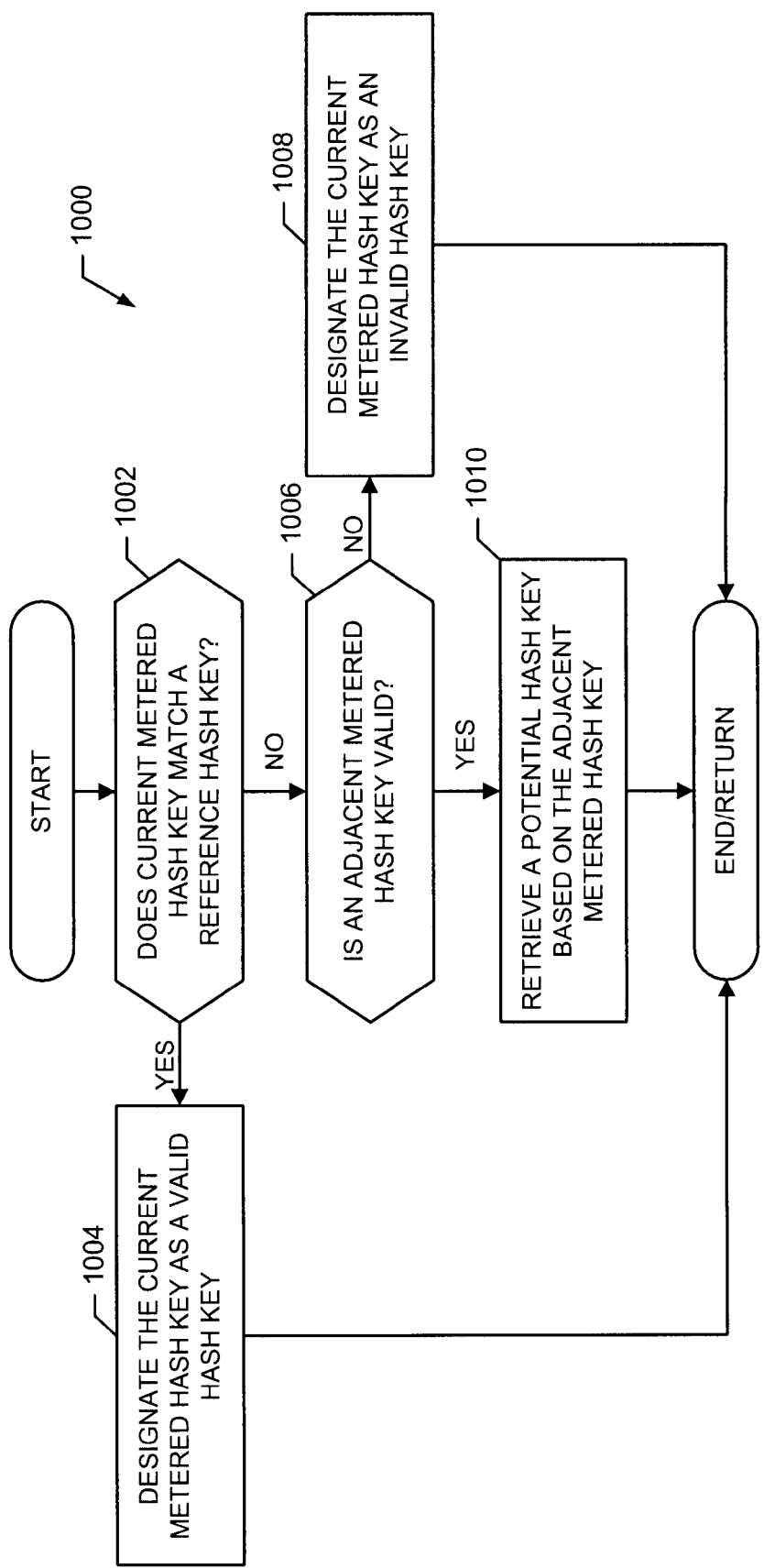
FIG. 10 is flow diagram representative of example machine readable instructions that may be executed to implement the hash key analyzer of FIGS. 6A and 6B to compare metered hash keys to reference hash keys.

An example program 1000 of FIG. 10 is executed to implement the example hash key analyzer 500 of FIGS. 5, 6A, and/or 6B to determine whether a metered hash key 104 (e.g., the current metered hash key 104a of FIG. 1) received from the media meter 100 (FIG. 1) is a valid hash key (e.g., a valid hash key 506 of FIG. 5). Initially, at block 1002, the example hash key comparator 600 (FIGS. 6A and 6B) determines whether the current metered hash key 104a matches a reference hash key (e.g., the reference hash key 204 of FIG. 2) from the reference database 118 (FIG. 1). If the current hash key 104a matches a reference hash key 204, program control advances to block 1004, at which the example hash key comparator 600 designates the current hash key 104*a* as valid (e.g., as the valid hash key 506 of FIG. 5). The example program 1000 then ends and/or control returns to a calling function or process such as the example process of FIG. 9.

If the current metered hash key 104*a* does not match a reference hash key 204 at block 1002, program control advances to block 1006. At block 1006, the example potential hash key retriever 602 verifies whether an adjacent metered hash key (e.g., the previous metered hash key 104*b* (FIG. 1) and/or the next metered hash key 104*c* (FIG. 1)) is valid. For example, when verifying the previous metered hash key 104*b*, the hash key analyzer 500 may track whether, during a prior iteration of matching metered hash keys 104 to reference hash keys 204, the previous metered hash key 104*b* was matched to a reference hash key 204. For example, when verifying the next metered hash key 104*c*, the hash key manager 116 may pause the current iteration of reference hash key matching for the current metered hash key 104*a*, execute an iteration of reference hash key matching for the next metered hash key 104*c*, and then resume reference hash key matching for the current metered hash key 104*a*. If an adjacent metered hash keys is not valid, program control advances to block 1008, at which the example hash key comparator 600 designates the current hash key 104*a* as an invalid hash key 508 (FIG. 5). The example program 1000 then ends.

If an adjacent metered hash key was verified to be valid at block 1006, program control advances to block 1010. At block 1010, the example potential hash key retriever 602 retrieves a potential hash key (e.g., the potential hash key 510 of FIG. 5) from a valid adjacent hash key. For example, when using the previous metered hash key 104*b*, the potential hash key retriever 602 retrieves the reference record 202 (FIG. 2) of the reference hash key 204 corresponding with the previous metered hash key 104*b*. In such examples, the potential hash key retriever 602 designates the next reference hash key 210 (FIG. 2) of the retrieved reference record 202 as the potential hash key 510. For example, when using the next metered hash key 104*c*, the potential hash key retriever 602 retrieves the reference record 202 of the reference hash key 204 corresponding with the next metered hash key 104*c*. In such examples, the potential hash key retriever 602 designates the previous reference hash key 208 of the retrieved reference record 202 as the potential hash key 510. The example program 1000 then ends and/or control returns to a calling function or process such as the example process of FIG. 9.

An example program 1100 represented by FIG. 11 is executed to implement the error handler 502 of FIGS. 5 and 7 to recover, if possible, a valid hash key (e.g., the valid hash key 506 of FIG. 5) based on an invalid hash key (e.g., the invalid hash key 508 of FIG. 5) and a potential hash key (e.g., the potential hash key 510 of FIG. 5) received, for example, from the hash key analyzer 500 of FIG. 5. Initially, at block 1102, the example bitwise comparator 700 (FIG. 7) calculates an error level (e.g., the error level 706 of FIG. 7) between the invalid hash key 508 and the potential hash key 510. In some examples, the bitwise comparator 700 performs a bitwise comparison (e.g., a bitwise exclusive OR, etc.) to calculate the error level. At block 1104, the example threshold comparator 702 (FIG. 7) determines whether the error level 706 calculated at block 1102 satisfies an error threshold (e.g., error threshold 708 of FIG. 7). Calculating the error level 706 and determining whether the error level 706 satisfies the error threshold 708 are discussed above in connection with FIG. 7. If the error level 706 satisfies the error threshold 708 (e.g., the error level 706 is less than or equal to the error threshold 708), program control proceeds to block 1106, at which the example hash key designator 704 (FIG. 7) designates the potential hash key 510 as the valid hash key 506. The example program 1100 then ends and/or control returns to a calling function or process such as FIG. 9. If the error level 706 error does not satisfy the error threshold (e.g., the error level 706 is greater than the error threshold 708), program control advances to block 1108, at which the example hash key designator 704 sets the valid hash key 506 to a NULL value. The example program 1100 then ends and/or control returns to a calling function or process such as FIG. 9.

An example program 1200 represented by FIGS. 12A and 12B is executed to implement the example hash key manager 116 of FIGS. 1 and 5 to expedite comparing and matching metered hash keys 104 (FIG. 1) received from the media meter 100 (FIG. 1) by using a next reference hash key (e.g. the next reference hash key 510 of FIG. 5) corresponding to a valid metered hash key. Initially, at block 1202 (FIG. 12A), the example hash key analyzer 500 (FIG. 5) sets a metered hash key 104 as the current metered hash key 104*a* (FIG. 1). At block 1204, the example hash key analyzer 500 determines whether the current metered hash key 104*a* is a valid hash key (e.g., the valid hash key 506 of FIG. 5). An example process that may be used to implement block 1204 to determine whether current metered hash key 104*a* is valid is described above in connection with FIG. 10.

At block 1206, the example hash key analyzer 500 determines whether the current metered hash key 104*a* is valid. If the current metered hash key 104*a* is valid, program control proceeds to block 1212 (FIG. 12B). Otherwise, if the current metered hash key 104*a* is not valid, program control proceeds to block 1208. At block 1208, the example error handler 502 (FIG. 5) determines whether a valid hash key 506 is recoverable from the invalid current metered hash key 104*a*. An example process that may be used to implement block 1208 to determine whether a valid hash key 506 is recoverable from the invalid current metered hash key 104*a* is described above in connection with FIG. 11. If a valid hash key 506 is recoverable (block 1210), program control proceeds to block 1212 (FIG. 12B). If a valid hash key 506 is not recoverable (block 1210), the example program 1100 ends.

At block 1212, the impression logger 504 (FIG. 5) generates an impression record (e.g., the impression record 302 of FIG. 3) based on the valid hash key 506 from block 1206 or block 1210. At block 1214, the hash key analyzer 500 accesses a next reference hash key 510 (FIG. 5) corresponding to the valid hash key 506 from block 1206 or block 1210. For example, the hash key analyzer 500 accesses the reference record 202 (FIG. 2) associated with the reference hash key 204 matched to the valid hash key 506. In such examples, the hash key manager 116 selects the next reference hash key 210 (FIG. 2) stored in association with the retrieved reference record 202. To start the comparing process with another metered hash key, at block 1216, the hash key analyzer 500 selects the next available metered hash key 104 (e.g., the next metered hash key 104*c* of FIG. 1) as the current metered hash key 104*a*. At block 1218, the example hash key analyzer 500 determines whether the next reference hash key 210 accessed at block 1214 matches the current metered hash key 104*a* selected at block 1216. If the next reference hash key 210 accessed at block 1214 matches the current metered hash key 104*a* selected at block 1216, program control advances to block 1220. Otherwise, if the next reference hash key 210 accessed at block 1214 does not match the current metered hash key 104a selected at block 1216, program control advances to block 1222.

At block 1220, the example hash key analyzer 500 designates the current metered hash key 104a selected at block 116 as a valid hash key 506. Program control then returns to block 1212 to continue to iterate through the metered hash keys. At block 1222, the example error handler 502 determines whether a valid hash key 506 is recoverable from the invalid current metered hash key 104a. An example process that may be used to implement block 1222 to determine whether a valid hash key 506 is recoverable from the invalid current metered hash key 104a is described above in connection with FIG. 11. At block 1224, if a valid hash key 506 is recoverable (block 1222), program control returns to block 1212 to continue to iterate through the metered hash keys. If a valid hash key 506 is not recoverable (block 1222), the example program returns to block 1204 (FIG. 12A).

An example program 1300 of FIG. 13 is executed to implement the example reference hash key generator 130 of FIGS. 1 and 4 to generate reference records (e.g., the reference records 202 of FIG. 2) based on reference media 122 (FIG. 1). Initially, at block 1302, the example hash key generator 400 (FIG. 4) generates reference hash keys based on the reference media 122. At block 1304, the example reference generator 402 (FIG. 4) selects one of the reference hash keys generated at block 1302. At block 1306, the example reference generator 402 generates a new reference record 202. At block 1308, the example reference generator 402 stores the reference hash key selected at block 1304 as the reference hash key 204 (FIG. 2) of the reference record 202 generated at block 1306, stores the adjacently preceding reference hash key as the previous reference hash key 208 (FIG. 2) of the reference record 202 generated at block 1306, and stores the adjacently following reference hash key as the next reference hash key 210 (FIG. 2) of the reference record 202 generated at block 1306.

At block 1310, the example reference generator 402 stores the reference metadata 206 in the reference record 202 generated at block 1306 as described above in connection with FIG. 4. At block 1312, the example reference generator 402 determines if an additional reference record is to be generated. For example, the reference generator 402 determines whether a reference record 202 has been generated for all of the reference hash keys generated at block 1302. If another reference record 202 is to be generated, program control returns to block 1304. If another reference record is not to be generated, program control proceeds to block 1314. At block 1314, the example reference generator 402 adds the reference record(s) 202 to the reference database 118 (FIG. 1). The example program 1300 then ends.

FIG. 14 is a flow diagram representative of example machine readable instructions 1400 that may be executed to implement the hash key manager 116 of FIGS. 1 and 5 to detect and/or correct unexpected hash keys (e.g., the unexpected hash key 802 of FIG. 8). Initially at block 1402, the example hash key analyzer 500 (FIG. 5) retrieves reference metadata (e.g., the reference metadata 206 of FIG. 2) from the reference database 118 (FIG. 1) for the current metered hash key 104a (FIG. 1). At block 1404, the example hash key analyzer 500 retrieves reference metadata 206 from the reference database 118 for an adjacent metered hash key (e.g., the previous metered hash key 804, the next metered hash key 806 of FIG. 8, etc.). At block 1406, the example hash key analyzer 500 determines whether the current metered hash key 104a is unexpected. In some examples, the current metered hash key 104a is unexpected if the title and/or media ID included in the reference metadata 206 retrieved at block 1402 and block 1404 do not match. If the current metered hash key 104a is unexpected (block 1406), program control advances to block 1408. Otherwise, if the current metered hash key 104a is not unexpected (1406), program control advances to block 1418.

At block 1408, the example hash key analyzer 500 retrieves a potential hash key (e.g., the potential hash key 510 of FIG. 5) from the adjacent metered hash key. At block 1410, the example error handler 502 (FIG. 5) calculates an error level (e.g., the error level 706 of FIG. 7) between the unexpected hash key 802 (FIG. 8) and the potential hash key retrieved at block 1408. At block 1412, the example error handler 502 determines whether the error level satisfies an error threshold (e.g., the error threshold 710 of FIG. 7). If the error level satisfies the error threshold (block 1412), program control advances to block 1416. Otherwise, if the error level does not satisfy the error threshold (block 1412), program control advances to block 1414. At block 1414, the example error handler 502 designates the unexpected hash key 802 as a valid hash key (e.g., the valid hash key 506 of FIG. 5). At block 1416, the example error handler 502 replaces the unexpected hash key 802 with the potential hash key. At block 1418, the example hash key analyzer 500 determines whether there is another hash key to review. If there is another hash key to review, program control returns to block 1402. Otherwise, if there is not another hash key to review, the example program 1400 ends.

Figure 15:
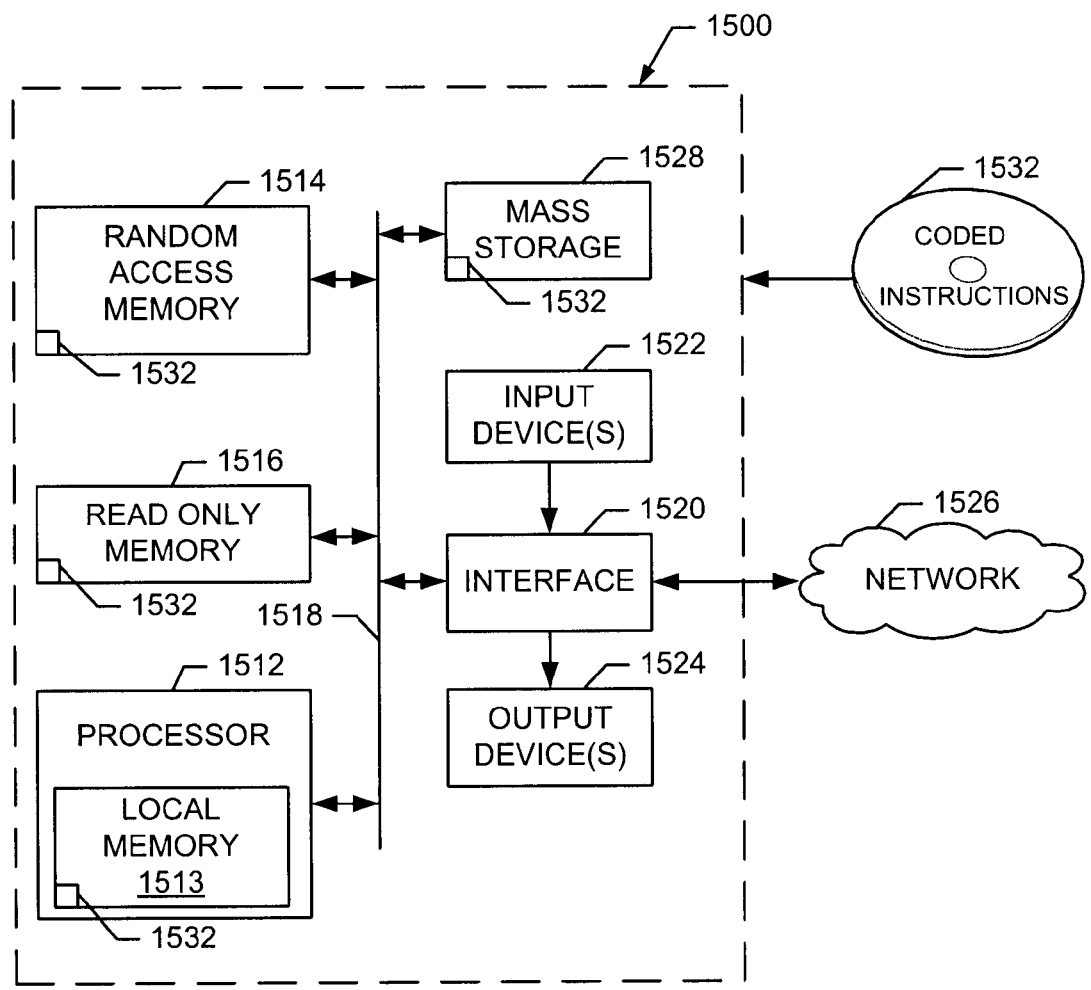
FIG. 15 is a block diagram of an example processor system that may execute any of the machine readable instructions represented by FIGS. 9, 10, 11, 12A, 12B, 13 and/or 14 to implement the apparatus of FIGS. 1, 4, 5, 6A, 6B, and/or 7.

FIG. 15 is a block diagram of an example processor platform 1500 capable of executing the instructions of FIGS. 9, 10, 11, 12A, 12B, 13 and/or 14 to implement the example hash key manager 116 of FIG. 5, the example hash key analyzer 500 of FIGS. 6A and 6B, the example error handler of FIG. 7, and/or the example reference hash key generator 120 of FIG. 4. The processor platform 1500 can be, for example, a server, a personal computer, a workstation, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

Coded instructions 1532 to implement the example processes of FIGS. 9, 10, 11, 12A, 12B, 13 and/or 14 may be stored in the mass storage device 1528, in the volatile memory 1514, in the non-volatile memory 1516, and/or on a removable tangible computer readable storage medium such as a CD or DVD.

From the foregoing, it will appreciate that examples have been disclosed which allow the recovery of metered hash keys produced from media sources that introduce noise into the metered hash keys. Additionally, examples have been disclosed which generate reference records that include information pertaining to reference hash keys for consecutive portions of a medium. Examples have been disclosed which increase the accuracy of impression data and reduce processing (e.g., reduce the burden on a semiconductor based processor) required to perform a match and/or to adjust for erroneous and/or missing impression data. Moreover, because erroneous hash keys can be adjusted efficiently, search time in a database to identify media is reduced. Reducing search time saves processing resources and reduces the energy consumption required to perform media monitoring.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   accessing, by executing an instruction with a processor, a first metered hash key and first reference metadata associated with the first metered hash key;
   accessing, by executing an instruction with the processor, second reference metadata associated with a second hash key adjacent to the first metered hash key;
   determining, by executing an instruction with the processor, if the first metered hash key is unexpected;
   when the first metered hash key is unexpected, generating, by executing an instruction with the processor, an error level using a first bitwise comparison of the first metered hash key and the second hash key;
   determining, by executing an instruction with the processor, if the error level satisfies a threshold; and
   when the processor determines that the error level satisfies the threshold:
      storing, by executing an instruction with the processor, the second hash key as the first metered hash key.

2. The method as defined in claim 1, wherein the first metered hash key is unexpected when at least one of a title or a media identification associated with the first reference metadata do not match at least one of a title or a media identification associated with the second reference metadata.

3. The method as defined in claim 1, wherein the threshold is set to a percentage of a bit length of the first metered hash key.

4. The method as defined in claim 1, further including:
   when the processor determines that the error level does not satisfy the threshold:
      storing, by executing an instruction with the processor, the first metered hash key as a valid hash key.

5. The method as defined in claim 1, wherein the first bitwise comparison includes an exclusive OR function.

6. The method as defined in claim 1, wherein the error level is indicative of a number of bits that are not identical between the first metered hash key and the second hash key.

7. The method as defined in claim 1, wherein the threshold is satisfied when the error level is less than or equal to the threshold.

8. An apparatus comprising:
   an error handler to:
      access a first metered hash key and first reference metadata associated with the first metered hash key;
      access second reference metadata associated with a second hash key adjacent to the first metered hash key;
      determine if the first metered hash key is unexpected;
      when the first metered hash key is unexpected, generate an error level using a first bitwise comparison of the first metered hash key and the second hash key;
      determine if the error level satisfies a threshold; and
      when the error level satisfies the threshold:
         store the second hash key as the first metered hash key.

9. The apparatus as defined in claim 8, wherein the first metered hash key is unexpected when at least one of a title or a media identification associated with the first reference metadata do not match at least one of a title or a media identification associated with the second reference metadata.

10. The apparatus as defined in claim 8, wherein the threshold is set to a percentage of a bit length of the first metered hash key.

11. The apparatus as defined in claim 8, wherein the error handler is further to:
   when the error level does not satisfy the threshold, store the first metered hash key as a valid hash key.

12. The apparatus as defined in claim 8, wherein the first bitwise comparison includes an exclusive OR function.

13. The apparatus as defined in claim 8, wherein the error level is indicative of a number of bits that are not identical between the first metered hash key and the second hash key.

14. The apparatus as defined in claim 8, wherein the threshold is satisfied when the error level is less than or equal to the threshold.

15. A tangible computer readable storage medium comprising instructions which, when executed by a processor, cause the processor to at least:

access a first metered hash key and first reference metadata associated with the first metered hash key;
access second reference metadata associated with a second hash key adjacent to the first metered hash key;
determine if the first metered hash key is unexpected;
when the first metered hash key is unexpected, generate an error level using a first bitwise comparison of the first metered hash key and the second hash key;
determine if the error level satisfies a threshold; and
when the error level satisfies the threshold:
store the second hash key as the first metered hash key.

16. The tangible computer readable storage medium as defined in claim 15, wherein the first metered hash key is unexpected when at least one of a title or a media identification associated with the first reference metadata do not match at least one of a title or a media identification associated with the second reference metadata.

17. The tangible computer readable storage medium as defined in claim 15, wherein the threshold is set to a percentage of a bit length of the first metered hash key.

18. The tangible computer readable storage medium as defined in claim 15, wherein the instructions, when executed by the processor, further cause the processor to:
when the error level does not satisfy the threshold, store the first metered hash key as a valid hash key.

19. The tangible computer readable storage medium as defined in claim 15, wherein the error level is indicative of a number of bits that are not identical between the first metered hash key and the second hash key.

20. The tangible computer readable storage medium as defined in claim 15, wherein the threshold is satisfied when the error level is less than or equal to the threshold.

* * * * *